United States Patent
Higuchi et al.

(10) Patent No.: US 12,441,605 B2
(45) Date of Patent: Oct. 14, 2025

(54) MEMS MODULE AND METHOD OF MANUFACTURING MEMS MODULE

(71) Applicant: ROHM CO., LTD., Kyoto (JP)

(72) Inventors: Toru Higuchi, Kyoto (JP); Kosuke Yamashiro, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 561 days.

(21) Appl. No.: 17/861,926

(22) Filed: Jul. 11, 2022

(65) Prior Publication Data
US 2023/0016038 A1    Jan. 19, 2023

(30) Foreign Application Priority Data

Jul. 13, 2021 (JP) .................................. 2021-115764

(51) Int. Cl.
*B81B 7/02* (2006.01)
*B81C 1/00* (2006.01)

(52) U.S. Cl.
CPC ............ *B81B 7/02* (2013.01); *B81C 1/00158* (2013.01); *B81B 2201/0264* (2013.01); *B81B 2203/0127* (2013.01); *B81B 2203/0315* (2013.01); *B81B 2203/0346* (2013.01); *B81B 2203/04* (2013.01); *B81B 2203/051* (2013.01); *B81B 2207/012* (2013.01); *B81B 2207/115* (2013.01); *B81C 2201/013* (2013.01); *B81C 2203/0109* (2013.01); *B81C 2203/032* (2013.01)

(58) Field of Classification Search
CPC . B81B 7/02; B81B 2201/0264; G01L 9/0073; G01L 9/0042
See application file for complete search history.

(56) References Cited

U.S. PATENT DOCUMENTS

| | | |
|---|---|---|
| 2012/0118068 A1 | 5/2012 | Yamada et al. |
| 2016/0169758 A1* | 6/2016 | Hooper .................. G01L 9/0073 73/717 |
| 2023/0228639 A1* | 7/2023 | Tsuji ....................... G01L 9/125 73/724 |

FOREIGN PATENT DOCUMENTS

WO    2011/010571 A1    1/2011

OTHER PUBLICATIONS

Japanese Office Action dated Mar. 25, 2025, in the counterpart Japanese Patent Application No. 2021-115764.

* cited by examiner

*Primary Examiner* — Moazzam Hossain
(74) *Attorney, Agent, or Firm* — Rabin & Berdo, P.C.

(57) ABSTRACT

A MEMS module includes: a first MEMS element and a second MEMS element each including a movable portion which is a portion of a substrate including a hollow portion formed therein, the movable portion configured to warp in shape according to an air pressure difference between an internal air pressure inside the hollow portion and an external air pressure outside the hollow portion; and an electronic component configured to calculate a change in external air pressure outside the substrate by using an amount of warpage of the movable portion of at least one of the first MEMS element and the second MEMS element, wherein the amount of warpage of the movable portion according to the external air pressure differs between the first MEMS element and the second MEMS element.

16 Claims, 31 Drawing Sheets

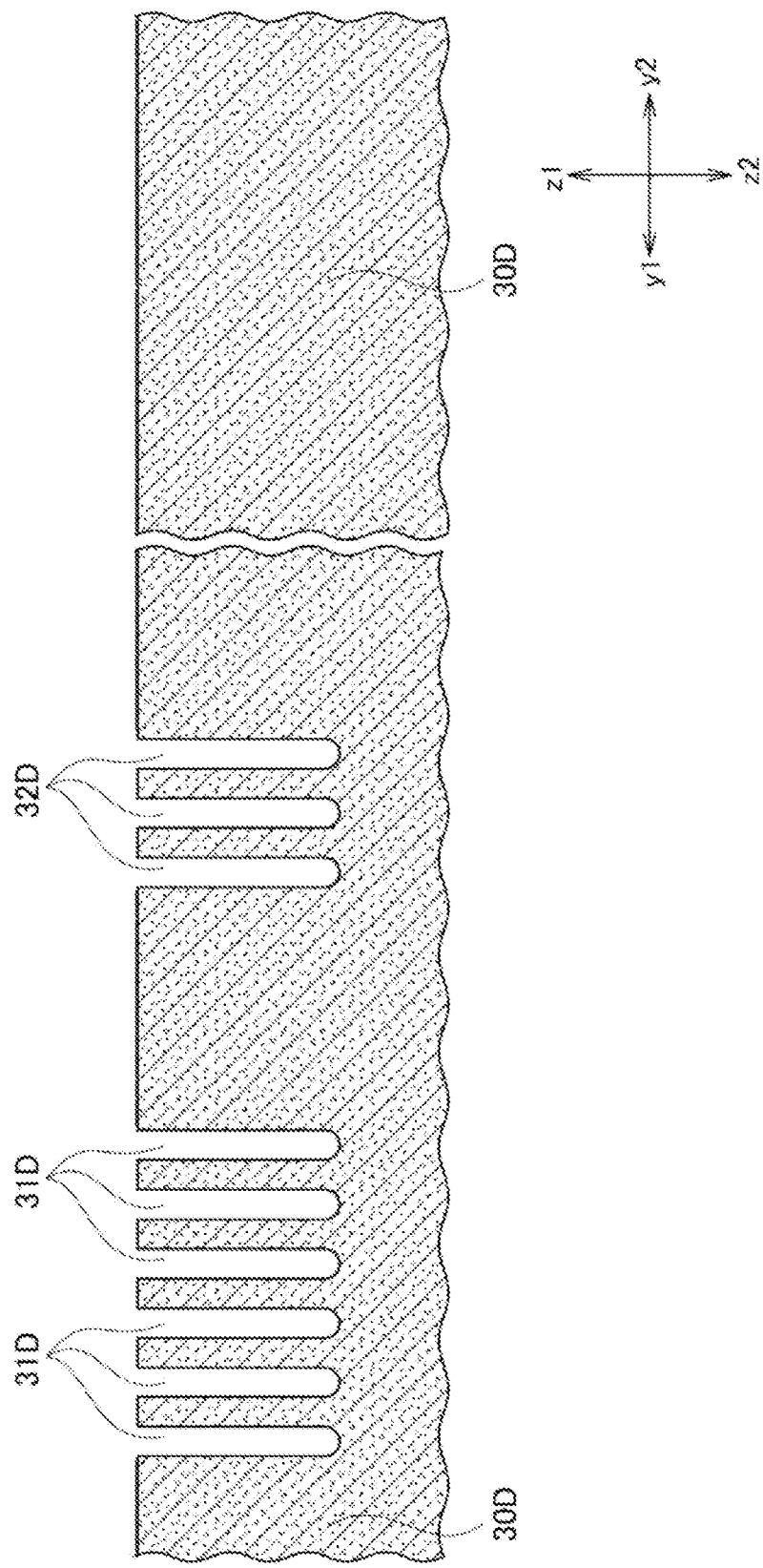

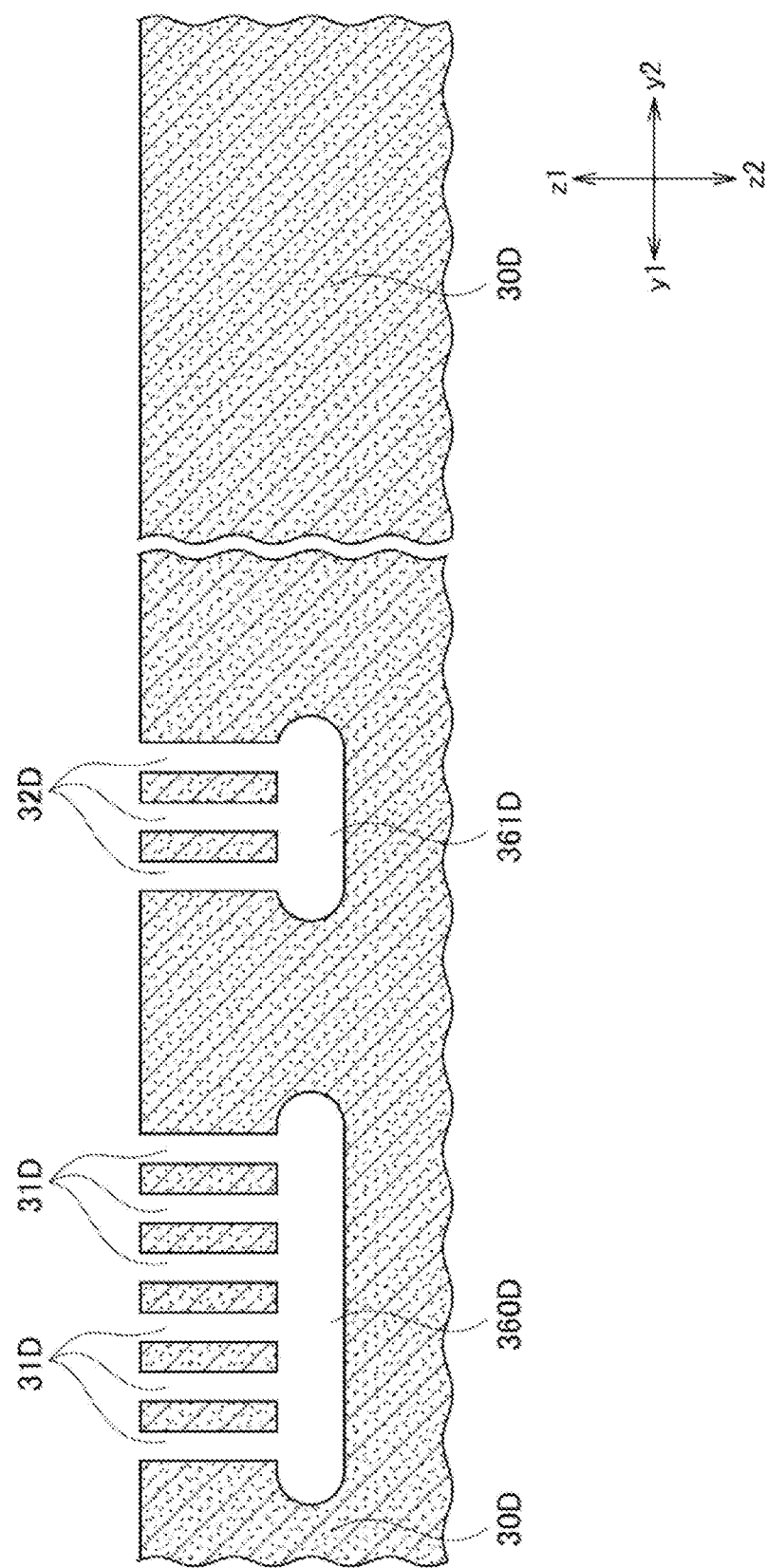

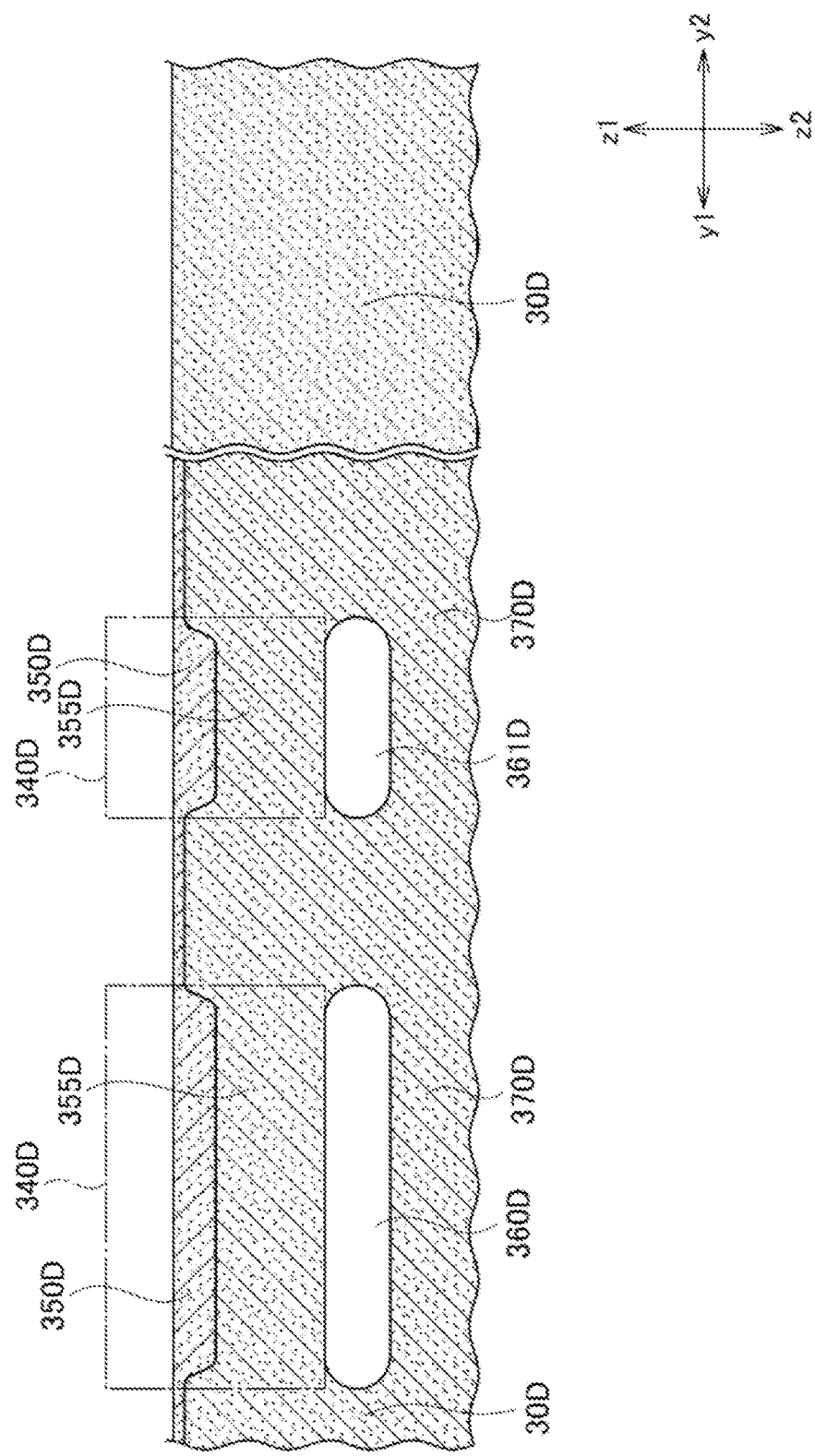

MEMS MODULE AND METHOD OF MANUFACTURING MEMS MODULE

CROSS-REFERENCE TO RELATED APPLICATION

This application is based upon and claims the benefit of priority from Japanese Patent Application No. 2021-115764, filed on Jul. 13, 2021, the entire contents of which are incorporated herein by reference.

TECHNICAL FIELD

The present disclosure relates to a MEMS module and a method of manufacturing the MEMS module.

BACKGROUND

There is known a MEMS (Micro Electromechanical System) element, which is a device including a machine element component and an electronic circuit integrated by utilizing a micromachining technique used for manufacturing a semiconductor integrated circuit. As a pressure sensor, a MEMS element including a movable portion (also referred to as a membrane) configured to detect an external air pressure is used.

However, in the pressure sensor using the MEMS element, detection sensitivity of the movable portion differs depending on a shape of the movable portion. Therefore, it may be difficult for one MEMS element to accurately detect a pressure in the entire pressure region.

SUMMARY

An embodiment of the present embodiment provides a MEMS module capable of more accurately deriving a change in external air pressure. Further, another embodiment of the present embodiment provides a method of manufacturing a pertinent MEMS element.

In the present embodiment, by providing a plurality of MEMS elements included in the MEMS module, it is possible for the MEMS module to more accurately derive a change in external air pressure. An embodiment of the present embodiment is as follows.

According to an embodiment of the present disclosure, there is provided a MEMS module including: a first MEMS element and a second MEMS element each including a movable portion which is a portion of a substrate including a hollow portion formed therein, the movable portion configured to warp in shape according to an air pressure difference between an internal air pressure inside the hollow portion and an external air pressure outside the hollow portion; and an electronic component configured to calculate a change in external air pressure outside the substrate by using an amount of warpage of the movable portion of at least one of the first MEMS element and the second MEMS element, wherein the amount of warpage of the movable portion according to the external air pressure differs between the first MEMS element and the second MEMS element.

According to another embodiment of the present disclosure, there is provided a MEMS module manufacturing method including: forming a plurality of grooves in a semiconductor layer included in a substrate; forming a hollow portion by etching the semiconductor layer from bottom surfaces of the grooves in a direction perpendicular to a depth direction of the grooves to connect the grooves and performing a heat treatment on the semiconductor layer so that a portion of the semiconductor layer melted by the heat treatment fills both ends of the grooves in the depth direction; forming an upper layer portion which is a portion of a movable portion adjoining the hollow portion when viewed in a thickness direction of the substrate; forming a first MEMS element and a second MEMS element by forming a film formation portion which is a portion of the movable portion in the thickness direction of the substrate; and forming an electronic component to which output signals of the first MEMS element and the second MEMS element on the substrate are inputted.

BRIEF DESCRIPTION OF DRAWINGS

The accompanying drawings, which are incorporated in and constitute a part of the specification, illustrate embodiments of the present disclosure.

FIG. 30 is a cross-sectional view (first cross-sectional view) showing a MEMS element manufacturing method according to the fifth embodiment.

FIG. 31 is a cross-sectional view (second cross-sectional view) showing the MEMS element manufacturing method according to the fifth embodiment.

FIG. 32 is a cross-sectional view (third cross-sectional view) showing the MEMS element manufacturing method according to the fifth embodiment.

DETAILED DESCRIPTION

Figure 1:
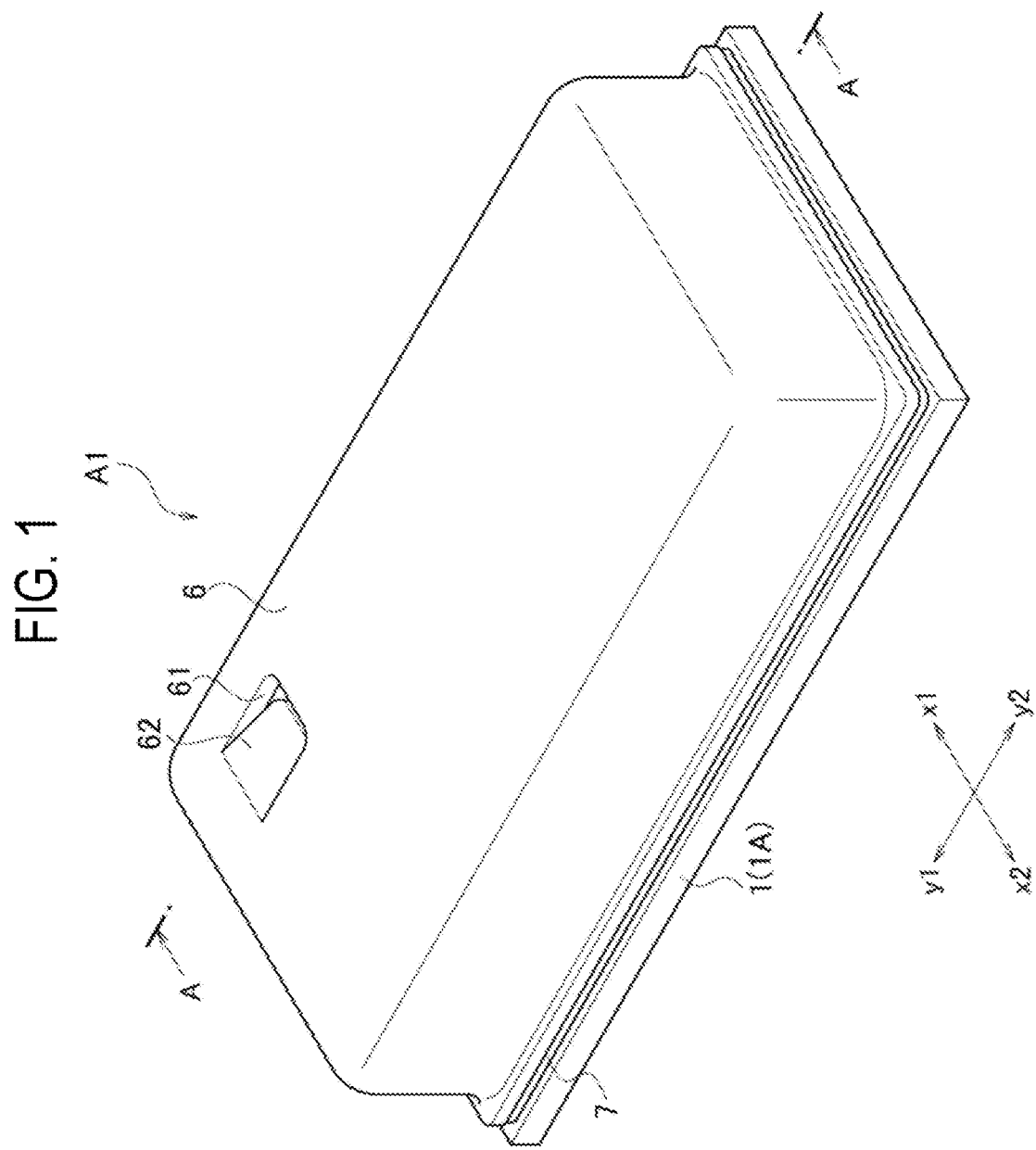
FIG. 1 is a perspective view showing a MEMS module according to a first embodiment of the present disclosure.

Next, the present embodiments will be described with reference to the drawings. In the description of the drawings described below, the same or similar parts are designated by the same or similar reference numerals. However, it should be noted that the drawings are schematic and a relationship between a thickness and a plane dimension of each component is different from ab actual one. Therefore, specific thickness and dimension should be determined in consideration of the following description. In addition, it goes without saying that parts having different dimensional relationships and ratios are included in the drawings.

Further, the embodiments described below exemplify devices and methods for embodying the technical idea, and do not specify material, shape, structure, arrangement, etc. of each component. The present embodiments may be modified in various ways within the scope of the claims.

An embodiment of the present disclosure is as follows.

<1> A MEMS module including: a first MEMS element and a second MEMS element each including a movable portion which is a portion of a substrate including a hollow portion formed therein, the movable portion configured to warp in shape according to an air pressure difference between an internal air pressure inside the hollow portion and an external air pressure outside the hollow portion; and an electronic component configured to calculate a change in external air pressure outside the substrate by using an amount of warpage of the movable portion of at least one of the first MEMS element and the second MEMS element, wherein the amount of warpage of the movable portion according to the external air pressure differs between the first MEMS element and the second MEMS element.

<2> The MEMS module of <1>, wherein the first MEMS element and the second MEMS element are included in different chip components, and the chip components are arranged to be spaced apart from each other.

<3> The MEMS module of <1>, wherein the first MEMS element and the second MEMS element are included in the same chip component.

<4> The MEMS module of any one of <1> to <3>, wherein a film thickness of the movable portion adjoining the hollow portion of the second MEMS element is larger than a film thickness of the movable portion adjoining the hollow portion of the first MEMS element.

<5> The MEMS module of <4>, wherein the movable portion includes an upper layer portion adjoining the hollow portion in a thickness direction of the substrate, and includes a film formation portion stacked on the upper layer portion.

<6> The MEMS module of <5>, wherein the movable portion of each of the first MEMS element and the second MEMS element further includes a protective film stacked on the film formation portion, and the protective film is made of at least one of a silicon oxide and a silicon nitride.

<7> The MEMS module of any one of <1> to <6>, wherein an area of the movable portion adjoining the hollow portion of the second MEMS element is smaller than an area of the movable portion adjoining the hollow portion of the first MEMS element when viewed in the thickness direction of the substrate.

<8> The MEMS module of any one of <1> to <7>, wherein the electronic component is included in an electronic component chip component different from chip components including the first MEMS element and the second MEMS element, and the first MEMS element and the second MEMS element are arranged on the electronic component chip component.

<9> The MEMS module of any one of <1> to <7>, wherein the electronic component is included in the same chip component as the first MEMS element and the second MEMS element.

<10> A MEMS module manufacturing method comprising:
  forming a plurality of grooves in a semiconductor layer included in a substrate; forming a hollow portion by etching the semiconductor layer from bottom surfaces of the grooves in a direction perpendicular to a thickness direction of the grooves to connect the grooves and performing a heat treatment on the semiconductor layer so that a portion of the semiconductor layer melted by the heat treatment fills both ends of the grooves in the depth direction;
  forming an upper layer portion which is a portion of a movable portion adjoining the hollow portion when viewed in a thickness direction of the substrate;
  forming a first MEMS element and a second MEMS element by forming a film formation portion which is a portion of the movable portion stacked on the upper layer portion in the thickness direction of the substrate; and forming an electronic component to which output signals of the first MEMS element and the second MEMS element on the substrate are inputted.

<11> The method of <10>, wherein the second MEMS element and the first MEMS element are configured as different chip components by being formed on the substrate and then diced.

<12> The method of <10>, wherein the second MEMS element and the first MEMS element are configured as the same chip component by being formed on the substrate.

<13> The method of any one of <10> to <12>, wherein the movable portion is formed so that a film thickness of the movable portion adjoining the hollow portion of the second MEMS element is larger than a film thickness of the movable portion adjoining the hollow portion of the first MEMS element.

<14> The method of <13>, wherein the movable portion includes an upper layer portion adjoining the hollow portion in the thickness direction of the substrate, and includes a film formation portion stacked on the upper layer portion.

<15> The method of <14>, wherein the movable portion of each of the first MEMS element and the second MEMS element further includes a protective film stacked on the film formation portion in the thickness direction of the substrate.

<16> The method of any one of <10> to <15>, wherein in the forming the plurality of grooves, the grooves are formed in a reduced number so that an area of the movable portion adjoining the hollow portion of the second MEMS element is smaller than an area of the movable portion adjoining the hollow portion of the first MEMS element when viewed in the thickness direction of the substrate.

<17> The method of any one of <10> to <16>, wherein the electronic component is formed on the substrate and then diced to form an electronic component chip component.

<18> The method of any one of <10> to <16>, wherein the electronic component is formed on the substrate to be spaced apart from the first MEMS element and the second MEMS element.

A MEMS module A1 according to the present embodiment will be described.

First Embodiment (MEMS Module)

Figure 2:
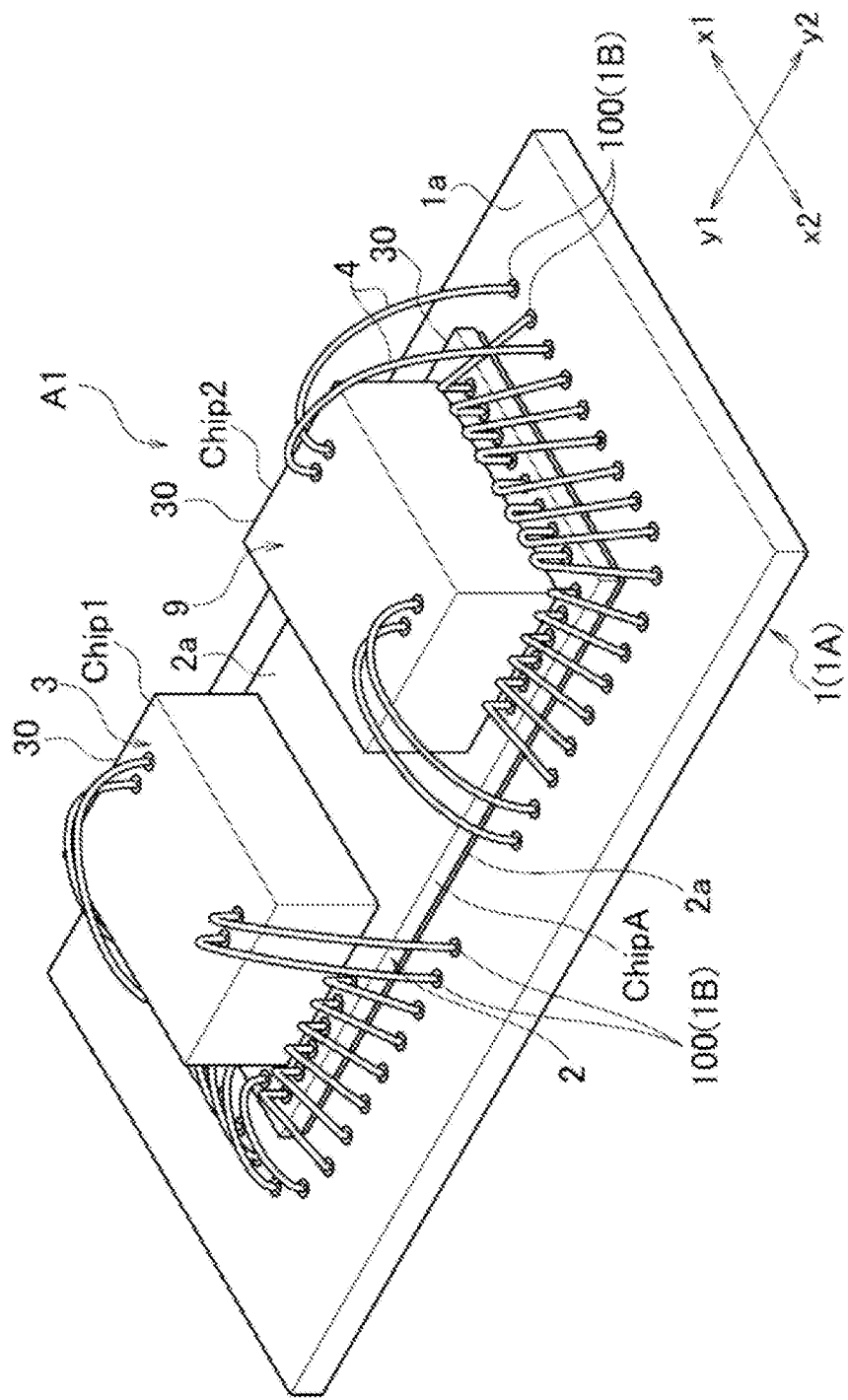
FIG. 2 is a main part perspective view showing the MEMS module according to the first embodiment.
Figure 3:
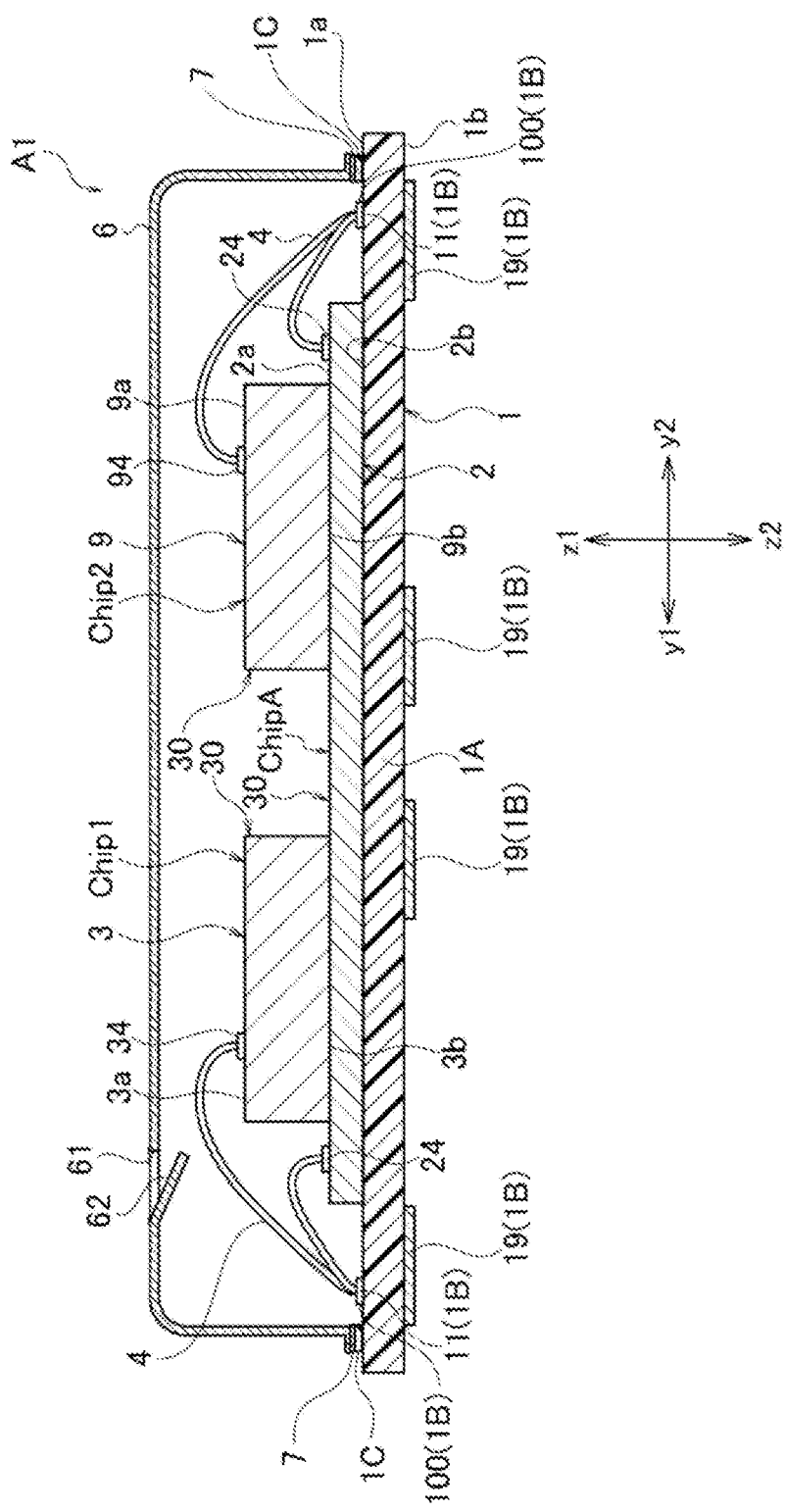
FIG. 3 is a cross-sectional view taken along a line A-A in FIG. 1.

FIG. 1 is an example of a perspective view showing a MEMS module A1. FIG. 2 is an example of a main part perspective view showing the MEMS module A1 shown in FIG. 1 with some configurations (a cover 6, bonding material 7, and the like described later) removed. FIG. 3 is an example of a cross-sectional view taken along a line A-A in FIG. 1.

As shown in FIGS. 1 and 2, the MEMS module A1 according to the present embodiment includes a substrate 1, an electronic component 2, a plurality of MEMS elements (e.g., a first MEMS element 3 and a second MEMS element 9), a plurality of wirings 4, a cover 6, and a bonding material 7.

The chip components Chip A, Chip1 and Chip2 include a substrate 30 obtained by dicing a semiconductor wafer into chips. The substrate 30 is, for example, a semiconductor wafer formed into chips after the first and second MEMS elements 3 and 9 and the electronic component 2 are formed on the semiconductor wafer. The chip component Chip A includes the substrate 30 on which the electronic component 2 is formed, and processes electric signals detected by the MEMS elements. Further, each of the chip components Chip 1 and Chip 2 includes a substrate 30 on which the first MEMS element 3 and the second MEMS element 9 are formed, detects an air pressure, and outputs the detection result as an electric signal. In the following description, the plurality of MEMS elements will be described as the first MEMS element 3 and the second MEMS element 9. The number of the MEMS elements may be three or more.

Further, in the present embodiment, a direction extending along a lateral direction of the MEMS module A1 is defined as an x direction (x1-x2 direction), a direction extending along a longitudinal direction is defined as a y direction (y1-y2 direction), and a thickness direction (plan-view direction) is defined as a z direction (z1-z2 direction). In the present embodiment, the MEMS module A1 has, for example, an x-direction dimension of about 2 mm, a y-direction dimension of about 4 mm, and a z-direction dimension of about 0.8 mm to 1 mm.

The MEMS module A1 of the present embodiment is configured to detect an air pressure, and is surface-mounted on, for example, a circuit board of various electronic devices such as a mobile terminal. For example, in a mobile terminal, the MEMS module A1 detects the atmospheric pressure. The detected atmospheric pressure is used as information for calculating an altitude.

As shown in FIG. 3, the substrate 1 is a member for mounting the electronic component 2 and attaching the MEMS module A1 to a circuit board of various electronic devices. As shown in FIG. 3, the substrate 1 includes a base material 1A, a wiring portion 1B, and an insulating layer 1C. The specific configuration of the substrate 1 is not particularly limited as long as it can appropriately support the electronic component 2 and the electronic elements such as the first MEMS element 3 and the second MEMS element 9. Examples of the substrate 1 include a printed circuit board. In the following description, the first MEMS element 3 and the second MEMS element 9 may be referred to as the first and second MEMS elements 3 and 9.

The base material 1A is formed of an electrical insulator and is a main constituent member of the substrate 1. Examples of the base material 1A include a glass epoxy resin, a polyimide resin, a phenol resin, ceramics, and the like. The base material 1A has, for example, a rectangular plate shape in a plan view, and includes a mounting surface 1a and an attaching surface 1b. The mounting surface 1a and the attaching surface 1b face opposite sides in the thickness direction (z direction) of the substrate 1. The mounting surface 1a is a surface facing the z1 direction, and is a surface on which the electronic component 2 is mounted. The attaching surface 1b is a surface facing the z2 direction, and is a surface used when attaching the MEMS module A1 to a circuit board of various electronic devices. In the present embodiment, the dimension of the substrate 1 in the x direction is about 2 mm, the dimension of the substrate 1 in the y direction is about 4 mm, and the dimension of the substrate 1 in the z direction is about 100 to 200 μm.

The wiring portion 1B forms an electric connection path that electrically connects the electronic component 2 and the first and second MEMS elements 3 and 9 to a circuit or the like outside the MEMS module A1. For example, the wiring portion 1B is made of one kind or an alloy of a plural kinds of metals such as Cu, Ni, Ti, and Au, and is formed by plating. In the present embodiment, the wiring portion 1B includes a plurality of mounting surface portions 100 and a back surface pad 19. However, these are examples of a specific configuration of the wiring portion 1B, and the configuration of the wiring portion 1B is not particularly limited.

As shown in FIG. 2, the mounting surface portions 100 are formed on the mounting surface 1a of the base material 1A, and are a plurality of independent regions spaced apart from each other. As shown in FIG. 3, each of the mounting surface portions 100 includes an electrode pad 11, and the end portion of a wiring 4 is bonded to the electrode pad 11.

The back surface pad 19 is provided on the attaching surface 1b, and is used as an electrode to be electrically connected and bonded when the MEMS module A1 is attached to a circuit board or the like. The back surface pad 19 is electrically connected to suitable positions of the mounting surface portions 100.

The insulating layer 1C covers an appropriate region of the wiring portion 1B to insulate and protect the region. The insulating layer 1C contains an insulating material and is formed of, for example, a resist resin. The insulating layer 1C may be formed, for example, in a rectangular annular shape in a plan view.

The bonding material 7 is used for boding the substrate 1 and the cover 6, and is made of, for example, a paste bonding material containing a metal such as Ag or the like. In the present embodiment, the bonding material 7 is provided in a rectangular annular shape in the plan view, and the entirety of the bonding material 7 is formed in a region overlapping with the insulating layer 1C.

The electronic component 2 is configured to process an electric signal detected by a sensor, and is configured as a so-called ASIC (Application Specific Integrated Circuit) element. The electronic component 2 may include, for example, a temperature sensor, and processes the electric signal detected by the temperature sensor and the electric signal detected by the first MEMS element 3 or the second MEMS element 9. The electronic component 2 multiplexes the electric signal detected by the temperature sensor and the electric signal detected by the first MEMS element 3 or the second MEMS element 9 by using a multiplexer, and converts the electric signals into digital signals by using an analog/digital conversion circuit. Then, a signal processing part performs processing such as amplification, filtering, logical operation, and the like based on a clock signal while using a storage area of a memory part. The processed signals are outputted via the interface. As a result, the MEMS module A1 can appropriately process and then output the signals obtained by detecting the air pressure and the air temperature.

The electronic component 2 is obtained by mounting and packaging various elements on a substrate and is used for control. As shown in FIGS. 2 and 3, the electronic component 2 has a rectangular plate shape in the plan view, and is included in the electronic component chip component Chip A including a mounting surface 2a and an attaching surface 2b. The mounting surface 2a and the attaching surface 2b face opposite sided from each other in the thickness direction (z direction) of the electronic component 2. The mounting surface 2a is a surface facing the z1 direction, and is a surface on which the first MEMS element 3 is mounted. The attaching surface 2b is a surface facing the z2 direction, and is a surface used when the electronic component 2 is attached to the mounting surface 1a of the substrate 1. In the present embodiment, for example, the dimension of the electronic component 2 in the x direction is about 1 to 1.2 mm, the dimension of the electronic component 2 in the y direction is about 2 to 2.4 mm, and the dimension of the electronic component 2 in the z direction is about 80 μm.

The electronic component 2 is mounted on the mounting surface 1a of the substrate 1. The electronic component 2 and the substrate 1 may be physically bonded by a die attachment film (not shown) or the like. A plurality of electrode pads 24 are provided on the mounting surface 2a of the electronic component 2. The electrode pads 24 is used as electrodes electrically connected to the electrode pads 11 of the substrate 1. The wirings 4 are bonded to the electrode pads 24. The electrode pads 24 are made of a metal such as, for example, Al or an aluminum alloy, and is formed by, for example, sputtering or plating. In the present embodiment, an Al layer formed by sputtering is used as the electrode pads 24. The electrode pads 24 are connected to the wiring patterns of the mounting surface 2a, and are arranged so as to surround the region where the first MEMS element 3 and the second MEMS element 9 are mounted. In the subject specification and the like, the expression "electrically connected" includes a case of being connected via "an object having some kind of electrical action". In this regard, the "object thing having some kind of electrical action" is not particularly limited as long as it can give and receive electric signals to and from a connection target. For example, the "object having some kind of electrical action" include an electrode, a wiring, a switching element, a resistance element, an inductor, a capacitive element, and other elements having various functions. The electronic component 2 may be electrically bonded to the substrate 1, for example, by providing bumps on the attaching surface 2b of the electronic component 2 and electrically bonding the electronic component 2 to the substrate 1 via the bumps which are electrode portions. The method of bonding the electronic component 2 and the substrate 1 is not limited to thereto.

In the first embodiment, the first and second MEMS elements 3 and 9 are configured as air pressure sensors configured to detect an air pressure. The first MEMS element 3 is, for example, a pressure sensor that detects an air pressure in a low pressure region (e.g., about 1 to 1013 hPa: 1 atm). The second MEMS element 9 is, for example, a pressure sensor that detects an air pressure in a high pressure region (e.g., about 2000 to 7000 hPa). Each of the first and second MEMS elements 3 and 9 detects an air pressure and outputs the detection result as an electric signal to the electronic component 2. As shown in FIGS. 2 and 3, the first MEMS element 3 is included in, for example, a chip component Chip 1 including a main surface 3a and an attaching surface 3b. The second MEMS element 9 is included in, for example, a chip component Chip 2 including a main surface 9a and an attaching surface 9b. That is, the first MEMS element 3 and the second MEMS element 9 are configured as different chip components. Further, the first and second MEMS elements 3 and 9 may have a rectangular parallelepiped shape or a cubic shape.

The main surface 3a and the attaching surface 3b face opposite sides from each other in the thickness direction (z direction) of the first MEMS element 3. The main surface 3a is a surface facing the z1 direction. The attaching surface 3b is a surface facing the z2 direction, and is a surface used when the first MEMS element 3 is attached to the electronic component 2. Further, the main surface 9a and the attaching surface 9b face opposite sides from each other in the thickness direction (z direction) of the second MEMS element 9. The main surface 9a is a surface facing the z1 direction. The attaching surface 9b is a surface facing the z2 direction, and is a surface used when the second MEMS element 9 is attached to the electronic component 2. In the first embodiment, the dimensions of the first and second MEMS elements 3 and 9 in the z direction are, for example, about 200 to 300 μm, and the dimensions of the first and second MEMS elements 3 and 9 in the x direction and the y direction are, for example, about 0.7 to 1.0 mm.

The first and second MEMS elements 3 and 9 are mounted on the mounting surface 2a of the electronic component 2. The first and second MEMS elements 3 and 9 and the electronic component 2 may be bonded by a silicone resin, a die attachment film, or the like (not shown). Further, in the y direction, the first and second MEMS elements 3 and 9 are spaced apart from each other.

A plurality of electrode pads 34 is provided on the main surface 3a of the first MEMS element 3. The electrode pads 34 are used as electrode electrically bonded to the electrode pads 11 of the substrate 1. Further, a plurality of electrode pads 94 is provided on the main surface 9a of the second MEMS element 9. The electrode pads 94 are used as electrodes electrically bonded to the electrode pads 11 of the substrate 1. The wirings 4 are bonded to the electrode pads 34 and 94. The electrode pads 34 and 94 are made of a metal such as, for example, Al or an aluminum alloy, and are formed by, for example, sputtering or plating. In the present embodiment, an Al layer formed by sputtering is used as the electrode pads 34 and 94. The electrode pads 34 and 94 are connected to the wiring patterns of the main surfaces 3a and 9a.

The wirings 4 electrically connect the electrode pads 11 of the substrate 1 to the electrode pads 24 of the electronic component 2, the electrode pads 34 of the first MEMS element 3, and the electrode pads 94 of the second MEMS element 9, respectively, and include a metal such as, for example, Au or the like. The material of the wirings 4 is not limited thereto, and may be, for example, Al, Cu, or the like. The wirings 4 bond the electrode pads 11 to the electrode pads 24, the electrode pads 34 and the electrode pads 94.

As shown in FIG. 3, the cover 6 is a metal-made box-shaped member, and is bonded to the mounting surface 1a of the substrate 1 by the bonding material 7 to surround the electronic component 2, the first MEMS element 3, the second MEMS element 9, and the wirings 4. In the illustrated example, the cover 6 is rectangular in a plan view. The cover 6 may be made of a material other than metal. Further, the manufacturing method of the cover 6 is not particularly limited. The space between the cover 6 and the substrate 1 is hollow or filled with soft resin such as a silicone resin or the like.

As shown in FIGS. 1 and 3, the cover 6 includes an opening 61 and an extension portion 62. The opening 61 is used for introducing external air to the inside. Since the opening 61 is provided and is kept hollow or filled with a soft resin such as a silicon resin or the like, the first MEMS element 3 and the second MEMS element 9 can detect the air pressure (e.g., atmospheric pressure) around the MEMS module A1, and the temperature sensor of the electronic component 2 can detect the air temperature around the MEMS module A1. In the present embodiment, only one opening 61 is arranged at a position on the side of the electrode pads 24 of the electronic component 2 in the z1 direction. The number of openings 61 is not particularly limited. For example, the extension portion 62 extends from the edge of the opening 61 and overlaps with at least a portion of the opening 61 in the plan view. The extension portion 62 is inclined to be located in the z2 direction and come closer to the substrate 1 as it extends toward the tip. Further, in the illustrated configuration, the tip of the extension portion 62 is provided at a position where it avoids the electronic component 2, the first MEMS element 3 and the second MEMS element 9 in the plan view. Similarly, the root of the extending portion 62 is provided at a position where it avoids the electronic component 2, the first MEMS element 3 and the second MEMS element 9. The extension portion 62 may not be provided.

(Internal Configuration Example of MEMS Element)

An internal configuration example of the first and second MEMS elements 3 and 9 constituting the MEMS module A1 according to the first embodiment will be described.

Figure 4:
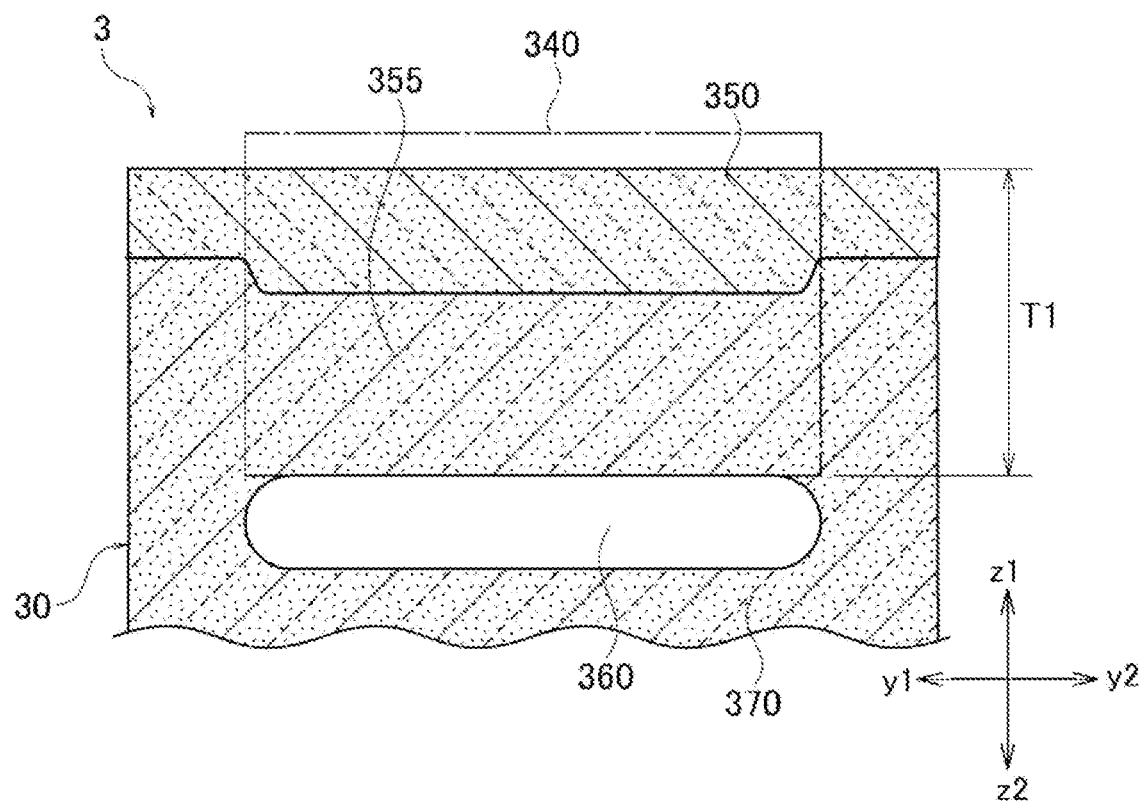
FIG. 4 is a cross-sectional view showing a first MEMS element.
Figure 5:
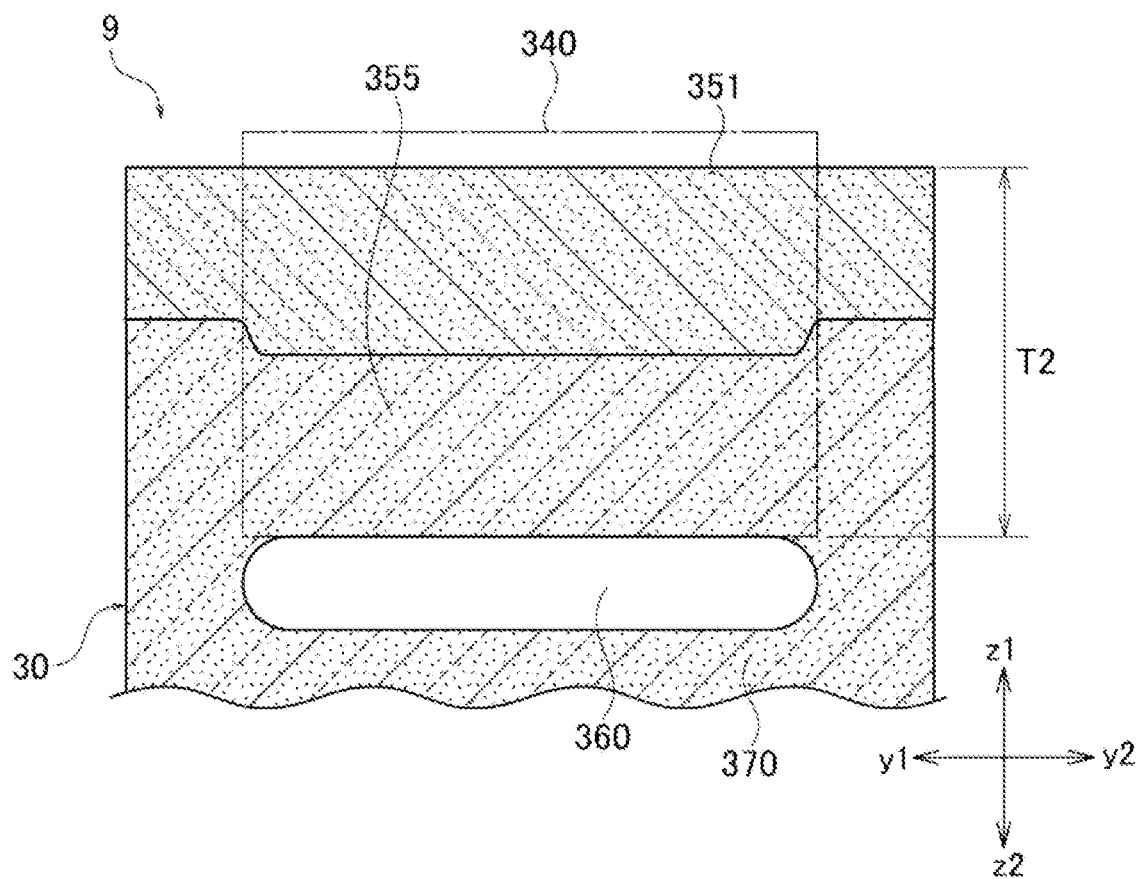
FIG. 5 is a cross-sectional view showing a second MEMS element.
Figure 6:
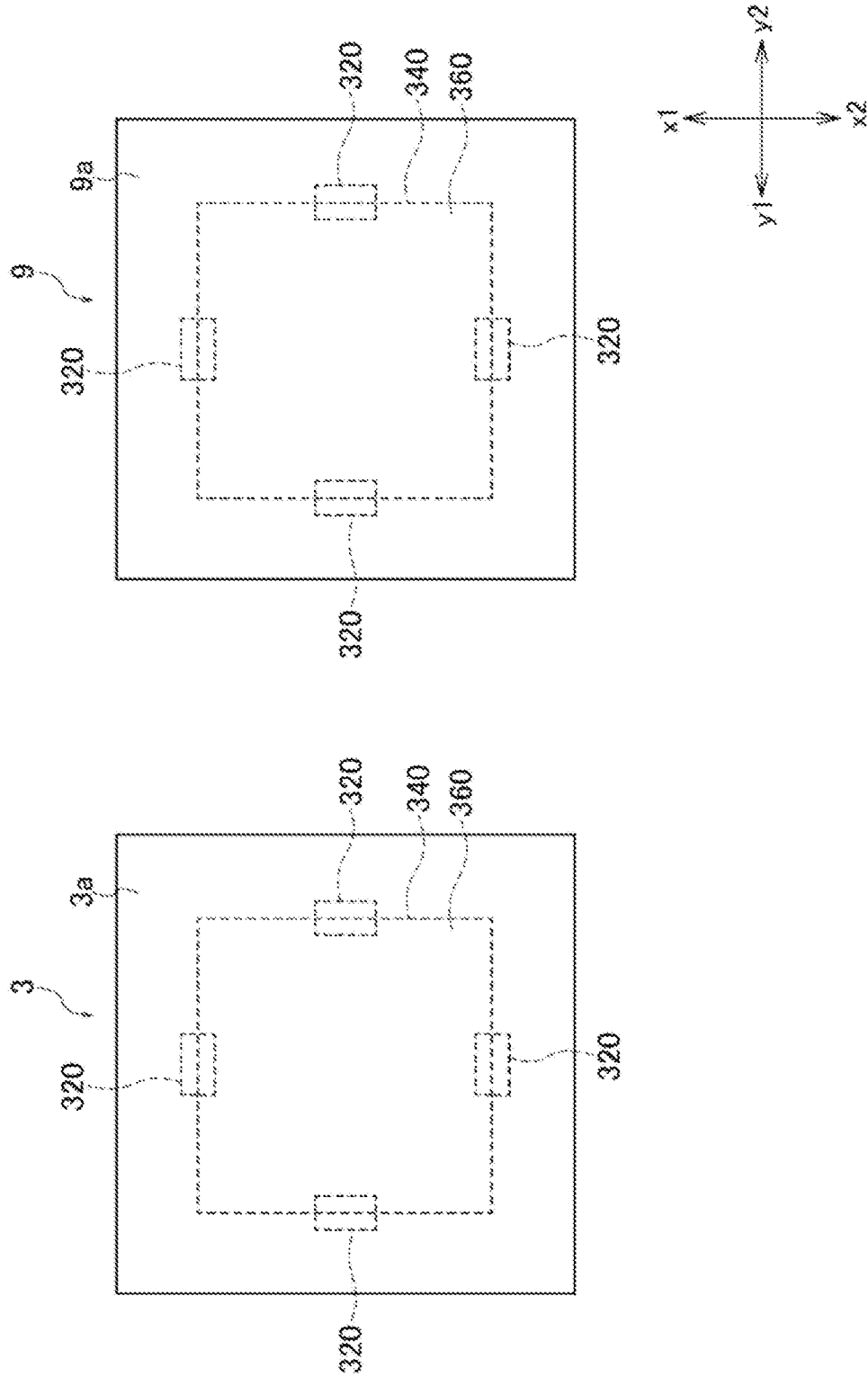
FIG. 6 is a plan view showing the first and second MEMS elements.

FIG. 4 is an example of a cross-sectional view of the first MEMS element 3 taken along the line A-A in FIG. 1. FIG. 5 is an example of a cross-sectional view of the second MEMS element 9 taken along the line A-A in FIG. 1. FIG. 6 is an example of a plan view showing the first and second MEMS elements.

As shown in FIGS. 4 and 5, the substrate 30 constituting the first and second MEMS elements 3 and 9 includes a movable portion 340, a hollow portion 360, and a fixed portion 370. Further, the movable portion 340 includes an upper layer portion 355 and film formation portions 350 and 351. In the first and second MEMS elements 3 and 9, film thicknesses of the film formation portions 350 and 351, which are parts of the movable portion 340 configured to detect a change in external air pressure, are different from each other.

The substrate 30 includes a semiconductor layer. Examples of the semiconductor layer include a silicon layer. The substrate 30 may be formed of, for example, only a silicon layer, or may be formed of a stacked film of an oxide film and a silicon layer such as a silicon oxide layer or the like.

As shown in FIGS. 4 and 5, the hollow portion 360 is provided inside the substrate 30. Further, the fixed portion 370 is a portion of the semiconductor layer of the substrate 30 provided in the z2 direction of the hollow portion 360. Further, the movable portion 340 is provided in the z1 direction of the hollow portion 360. The upper layer portion 355, which is a portion of the movable portion 340, is a portion of the semiconductor layer of the substrate 30 provided in the z1 direction of the hollow portion 360. The film formation portions 350 and 351, which are parts of the movable portion 340, are films stacked on the upper layer portion 355 and provided in the z1 direction of the upper layer portion 355.

The film thicknesses T1 and T2 of the movable portions 340 of the first and second MEMS elements 3 and 9 are total film thicknesses of the upper layer portion 355 and the film formation portions 350 and 351. The film thicknesses T1 and T2 of the movable portions 340 of the first and second MEMS elements 3 and 9 may be made different by changing the film thickness of the upper layer portion 355.

The movable portion 340 overlaps with the hollow portion 360 when viewed in the z direction, and moves in the z direction to detect an air pressure. In the present embodiment, the movable portion 340 has a rectangular shape when viewed in the z direction. The film thicknesses T1 and T2 of the movable portions 340 may be set to a thickness at which the movable portions 340 can be deformed by the difference between the internal air pressure inside the hollow portion 360 and the external air pressure outside the hollow portion 360, and may be, for example, 5 to 15 μm. By making the film thicknesses T1 and T2 of the movable portions 340 relatively small, it is possible to detect the air pressure accurately. By making the film thicknesses T1 and T2 of the movable portions 340 relatively large, it is possible to detect air pressure in a high air pressure region. In the following description, the air pressure in the high air pressure region is also referred to as a high air pressure.

The hollow portion 360 is a cavity provided in the substrate 30, and is sealed in the present embodiment. The hollow portion 360 may be kept in vacuum. Further, in the present embodiment, the hollow portion 360 has a rectangular shape when viewed in the z direction. However, the present disclosure is not limited thereto. The dimension in the z direction (depth) of the hollow portion 360 is, for example, 5 to 15 μm.

The fixed portion 370 is a portion that supports the movable portion 340, and is a portion that is fixed to the substrate 1 or the electronic component 2 when the movable portion 340 operates. In the present embodiment, the portion of the substrate 30 other than the movable portion 340 and the hollow portion 360 is referred to as a fixed portion 370.

In the present embodiment, the movable portion 340 and the fixed portion 370 include the same single semiconductor having no joint at the boundary between them.

The first and second MEMS elements 3 and 9 generate electric signals according to the shape (warpage degree) of the movable portion 340 that is deformed by the difference between internal air pressure inside the hollow portion 360 and the external air pressure outside the hollow portion 360, and output the electric signals to the electronic component 2. As shown in FIG. 6, a gauge resistor 320 whose resistance value changes according to the deformation of the movable portion 340 is provided on each of the main surfaces 3a and 9a of the first and second MEMS elements 3 and 9. Further, as shown in FIG. 3, metal wirings are formed on the main surfaces 3a and 9a of the first and second MEMS elements 3 and 9 by sputtering or the like. The electrode pads 34 and 94 are formed at predetermined positions on the metal wirings. The first and second MEMS elements 3 and 9 may include protective films (not shown) formed on the main surfaces 3a and 9a of the first and second MEMS elements 3 and 9. Examples of the protective films include a resin, a silicon oxide film, and a silicon nitride film.

Next, a method of manufacturing the MEMS module A1 will be described. In the following description, a method of manufacturing the first and second MEMS elements 3 and 9 will be described. A method of manufacturing the electronic component 2 will not be described.

Figure 7:
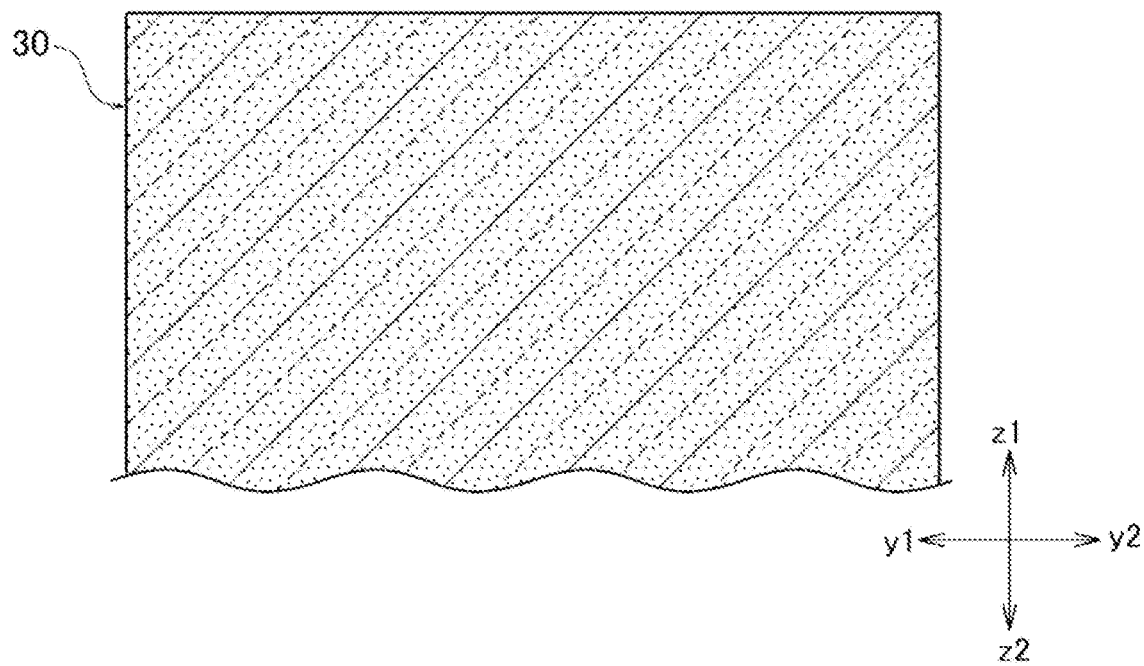
FIG. 7 is a cross-sectional view (first cross-sectional view) showing a MEMS element manufacturing method according to the first embodiment.

First, as shown in FIG. 7, a substrate 30 including a semiconductor layer is provided. Examples of the semiconductor layer include a silicon layer. The thickness of the substrate 30 is, for example, about 700 to 800 μm.

Figure 8:
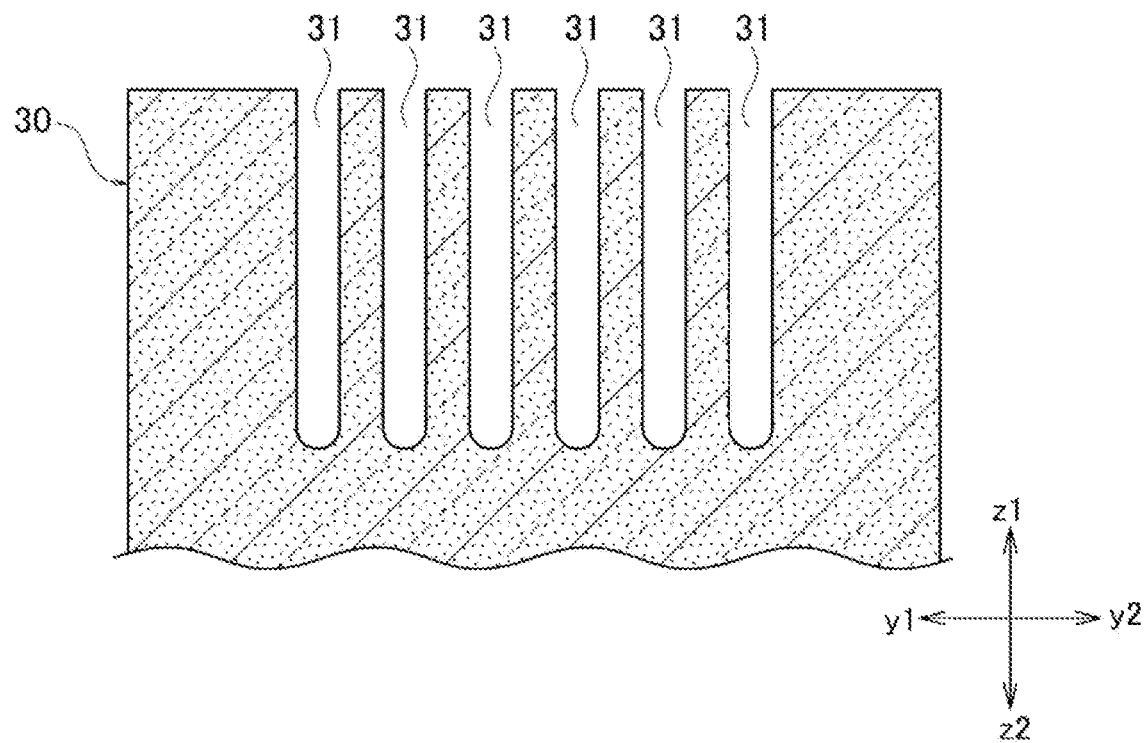
FIG. 8 is a cross-sectional view (second cross-sectional view) showing the MEMS element manufacturing method according to the first embodiment.

Next, as shown in FIG. 8, a plurality of grooves 31 is formed on the substrate 30. The grooves 31 may be formed by, for example, deep etching such as the Bosch method or the like. Taking an example of the dimensions of the grooves 31, a diameter of the grooves 31 having a circular shape when viewed in the z-direction is 0.2 to 0.8 μm, and a pitch (inter-center distance) of the adjacent grooves 31 is 0.4 to 1.4 μm. Further, in the present embodiment, the dimensions of the grooves 31 when viewed in the z-direction are substantially the same.

Figure 9:
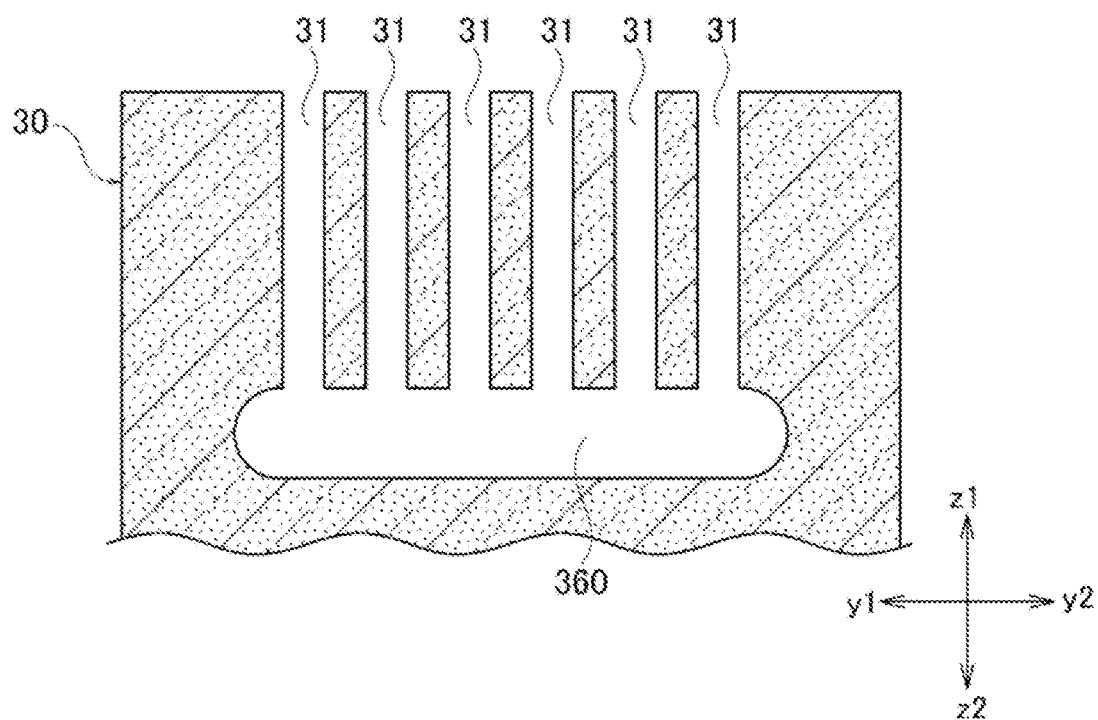
FIG. 9 is a cross-sectional view (third cross-sectional view) showing the MEMS element manufacturing method according to the first embodiment.

Next, as shown in FIG. 9, the substrate 30 is etched from the bottom surfaces of the grooves 31 in a direction perpendicular to the depth direction of the grooves 31 to form a hollow portion 360 connecting the grooves 31. In the following description, this step is also referred to as a hollow portion forming step. In the hollow portion forming step, isotropic etching and anisotropic etching are performed so that the cross-sectional area perpendicular to the z direction gradually increases. As a result, the step of forming the grooves 31 and the hollow portion forming step can be continuously performed by the same processing, which makes it possible to efficiently form the hollow portion 360.

Figure 10:
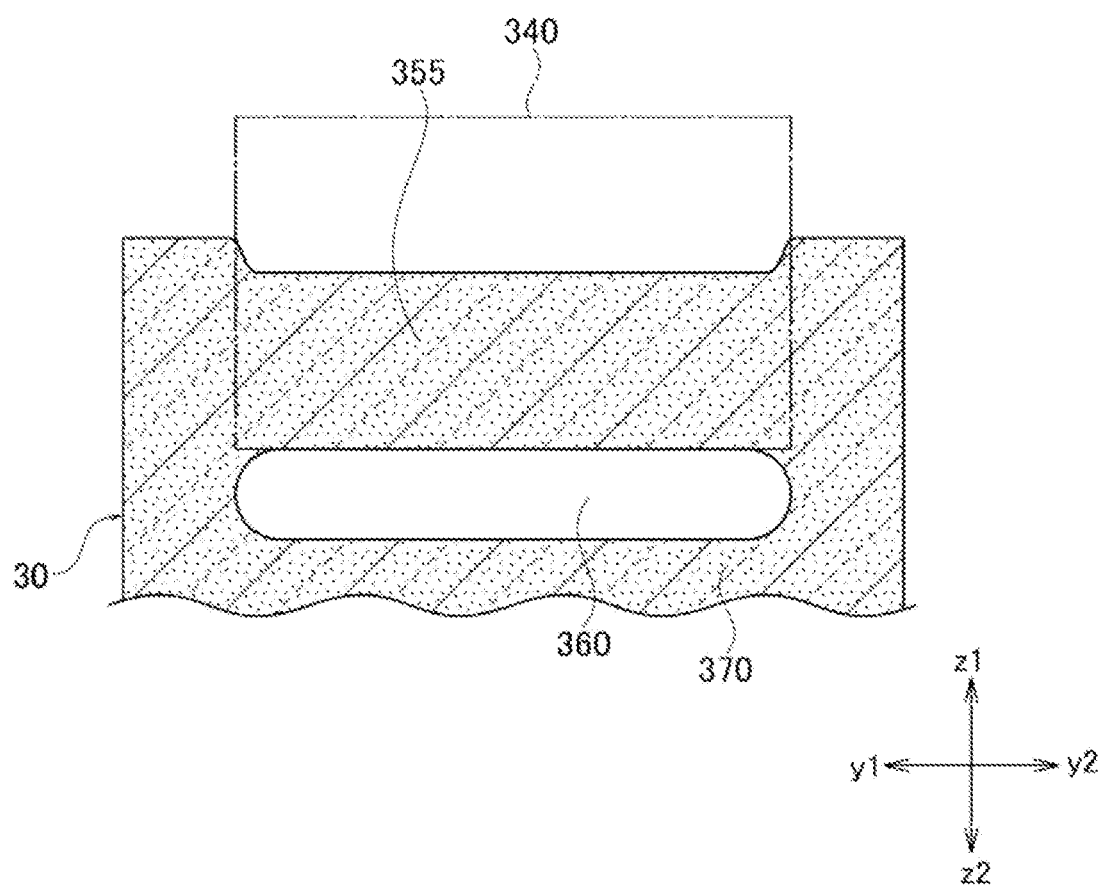
FIG. 10 is a cross-sectional view (fourth cross-sectional view) showing the MEMS element manufacturing method according to the first embodiment.

Next, as shown in FIG. 10, the substrate 30 is heat-treated (at, e.g., 1100 to 1200 degrees C.) in an atmosphere containing hydrogen to form an upper layer portion 355 which is a portion of the movable portion 340. In the following description, this step will also be referred to as a movable portion forming step. In the movable portion forming step, a portion of the substrate 30 melted by the heat treatment fills the grooves 31. As a result, the hollow portion 360 is sealed. Further, the upper layer portion 355, which is a portion of the movable portion 340, includes a recess. In this manufacturing method, a step of bonding a plurality of different members is not required to form a portion of the movable portion 340 and the hollow portion 360. This provides an advantage that the airtightness does not deteriorate at the bonded portion. Further, there is an advantage that it is not necessary to provide, for example, excessively large grooves penetrating the substrate 30 to form the hollow portion 360.

In the movable portion forming step, the grooves 31 are filled by partially moving the semiconductor layer through the use of thermal migration. Therefore, the upper layer portion 355, which is a portion of the movable portion 340, is a portion made of the material of the semiconductor layer, and is integrally connected to the fixed portion 370 similarly made of the material of the semiconductor layer without a bonding portion. This makes it possible to enhance the airtightness of the hollow portion 360.

Further, as shown in FIGS. 4 and 5, a film formation portion 350 is formed on the main surface of the substrate 30 facing the z1 direction. As the film formation portion 350, for example, a silicon layer deposited by a CVD method may be used. That is, by depositing a semiconductor layer, the semiconductor layer of the first and second MEMS elements is made thick. In the second MEMS element 9, the film formation portion 350 is formed to be thicker than that of the first MEMS element. Therefore, the film thickness T2 of the movable portion 340 of the second MEMS element 9 is larger than the film thickness T1 of the movable portion 340 of the first MEMS element 3. That is, the second MEMS element 9 can detect a higher air pressure than the first MEMS element 3. As a result, the first and second MEMS elements 3 and 9 can detect air pressures in different pressure ranges. The second MEMS element 9 may be formed on, for example, a semiconductor wafer for the second MEMS element rather than the semiconductor wafer for forming the first MEMS element 3, and a chip component Chip 2 may be configured by using the substrate that has been converted into a chip after the formation of the second MEMS element 9.

By the above steps, the first and second MEMS elements 3 and 9 can be manufactured. Further, after manufacturing the first and second MEMS elements 3 and 9, the substrate 30 including the first MEMS element 3 and the second MEMS element 9 may be divided into different chip components (e.g., chip component Chip 1 and chip component Chip 2).

Next, as shown in FIG. 3, an electronic component 2 is mounted on the substrate 1, and a plurality of chip components including the first and second MEMS elements is mounted on the electronic component 2. Further, wirings 4 for electrically connecting the electrode pads 11 of the substrate 1, the electrode pads 24 of the electronic component 2, the electrode pads 34 of the first MEMS element 3 and the electrode pads 94 of the second MEMS element 9 are formed. Finally, the cover 6 and the substrate 1 are bonded by a bonding material 7. The electronic component 2 may be formed on the substrate 30, or may be formed as a chip component Chip A by using a substrate in which a semiconductor wafer for an electronic component is converted into a chip, separately from the semiconductor wafer on which the first and second MEMS elements 3 and 9 are formed.

By the above steps, a MEMS module A1 can be manufactured. In the MEMS module A1, a plurality of MEMS elements (e.g., the first MEMS element 3 and the second MEMS element 9) whose movable portions 340 have different film thicknesses is provided in different chip components. Therefore, it is possible to detect pressures in different pressure ranges without reducing the accuracy. Further, since the structural difference between the first and second MEMS elements 3 and 9 is the film thicknesses of the movable portions 340, it is possible to easily form a plurality of MEMS elements (e.g., the first MEMS element 3 and the second MEMS element 9) by forming the MEMS elements as different thick films in the step of increasing the thickness of the MEMS element.

<Operation Example of MEMS Module>

An example of the operation of the present embodiment will be described below. The operation of the present embodiment is not limited to the following operation example.

Figure 11:
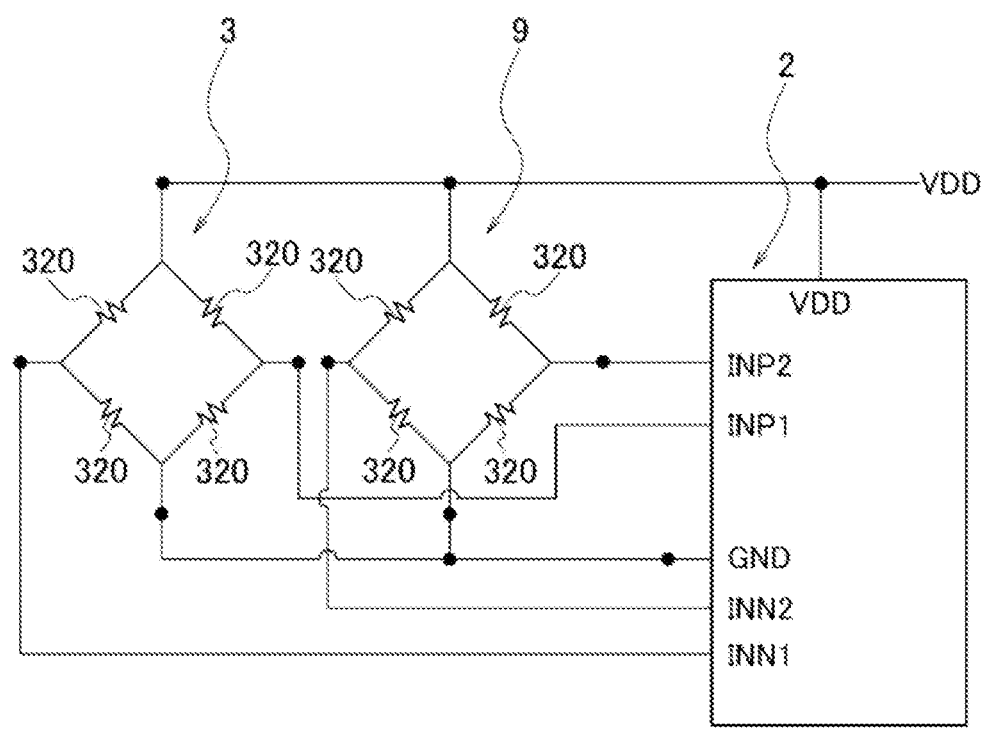
FIG. 11 is a circuit equivalent diagram of a MEMS module according to the present embodiment.

FIG. 11 is an equivalent circuit of the MEMS modules A1 to A5 according to the present embodiment. In the following description, the first MEMS module A1 will be specifically described.

As shown in FIGS. 6 and 11, the first MEMS element 3 of the MEMS module A1 includes, for example, four gauge resistors 320. As shown in FIG. 6, the gauge resistors 320 are arranged, for example, at both ends in the x and y directions of the movable portion 340 adjoining the hollow portion 360. Further, as shown in FIG. 11, the gauge resistors 320 are electrically connected to adjacent gauge resistors. Further, there are four junctions where the gauge resistors 320 are connected to each other, including a first junction connected to a power supply terminal VDD, a second junction connected to a ground terminal GND, a third junction connected to an input terminal INP1 of the electronic component 2, and a fourth junction connected to the input terminal INN1 of the electronic component 2.

Similarly, as shown in FIGS. 6 and 11, the second MEMS element 9 of the MEMS module A1 includes, for example, four gauge resistors 320. As shown in FIG. 6, the gauge resistors 320 are arranged, for example, at both ends in the x and y directions of the movable portion 340 adjoining the hollow portion 360. Further, the gauge resistors 320 are electrically connected to adjacent gauge resistors. Further, there are four junctions where the gauge resistors 320 are connected to each other, including a first junction connected to the power supply terminal VDD, a second junction connected to the ground terminal GND, a third junction connected to an input terminal INP2 of the electronic component 2, and a fourth junction connected to the input terminal INN2 of the electronic component 2.

As shown in FIG. 11, the electronic component 2 is connected to the power supply terminal VDD and the ground terminal GND. In the electronic component 2, the detection results of the first and second MEMS elements 3 and 9 are inputted to the input terminals INP1, INN1, INP2 and INN2. The voltage inputted to the input terminal INP1 is defined as VINP1, the voltage inputted to the input terminal INN1 is defined as VINN1, the voltage inputted to the input terminal INP2 is defined as VINP2, and the voltage inputted to the input terminal INN2 is defined as VINN2.

In the electronic component 2, for example, the first MEMS element 3 detects an external air pressure in a relatively low air pressure region (low air pressure region), and the second MEMS element 9 detects an external air pressure in a relatively high air pressure region (high air pressure region). In the case of the low air pressure region, the electronic component 2 can calculate a change in air pressure detected by the first MEMS element 3, based on a change (a difference between VINP1 and VINN1) outputted by the first MEMS element 3 capable of accurately detecting an air pressure according to a difference in shape of the movable portion 340 having a relatively small thickness. Further, for example, in the case of the high air pressure region, the electronic component 2 can calculate a change in air pressure detected by the second MEMS element 9, based on a change (a difference between VINP2 and VINN2) outputted by the second MEMS element 9 configured to detect a high air pressure according to a difference in shape of the movable portion 340 having a relatively large thickness.

According to the present embodiment, the MEMS module A1 including the electronic component 2 and the plurality of MEMS elements (e.g., the first and second MEMS elements 3 and 9) can accurately derive a change in external air pressure.

Second Embodiment

A MEMS module A2 according to a second embodiment of the present will be described.

Figure 12:
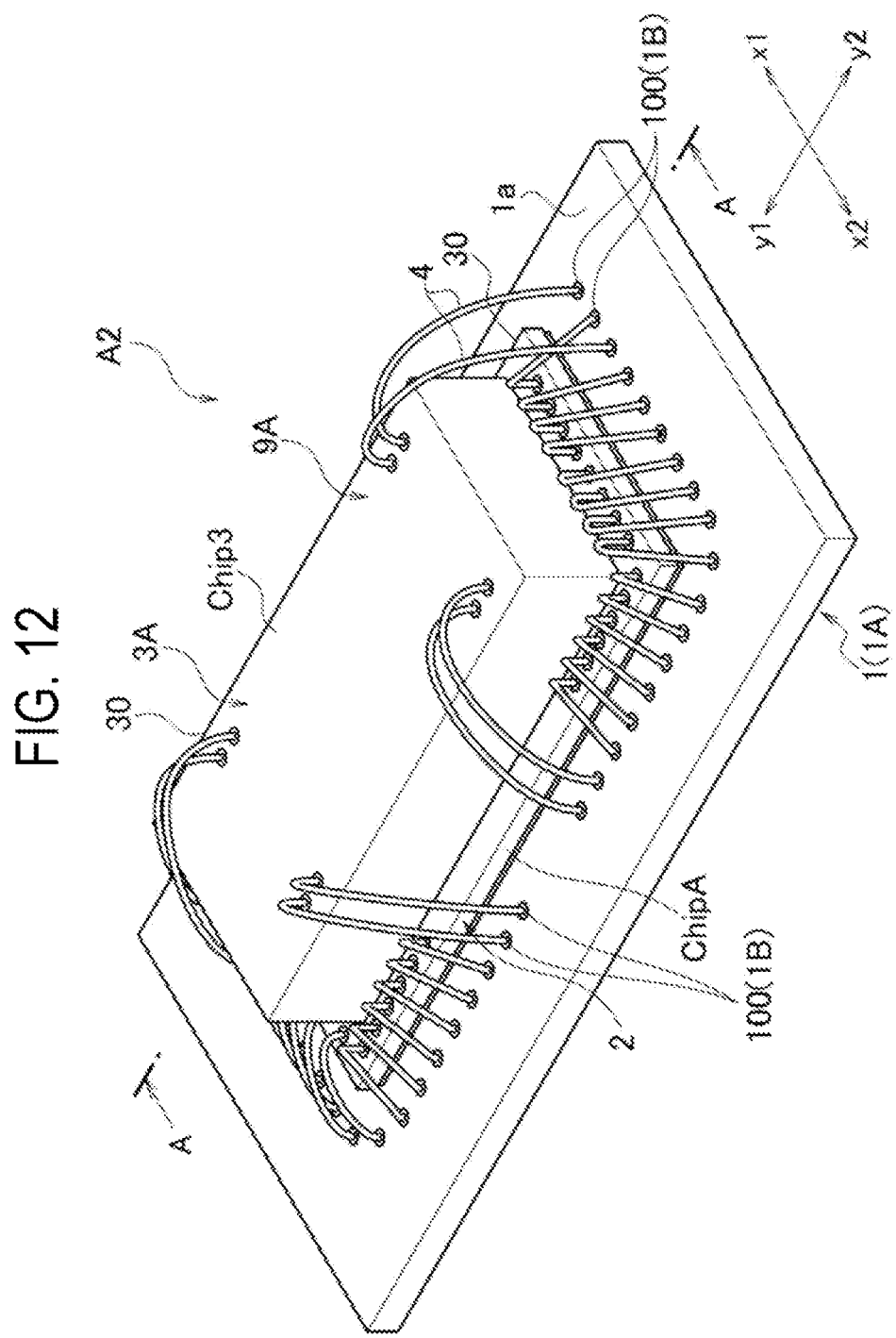
FIG. 12 is a main part perspective view showing a MEMS module according to a second embodiment of the present disclosure.
Figure 13:
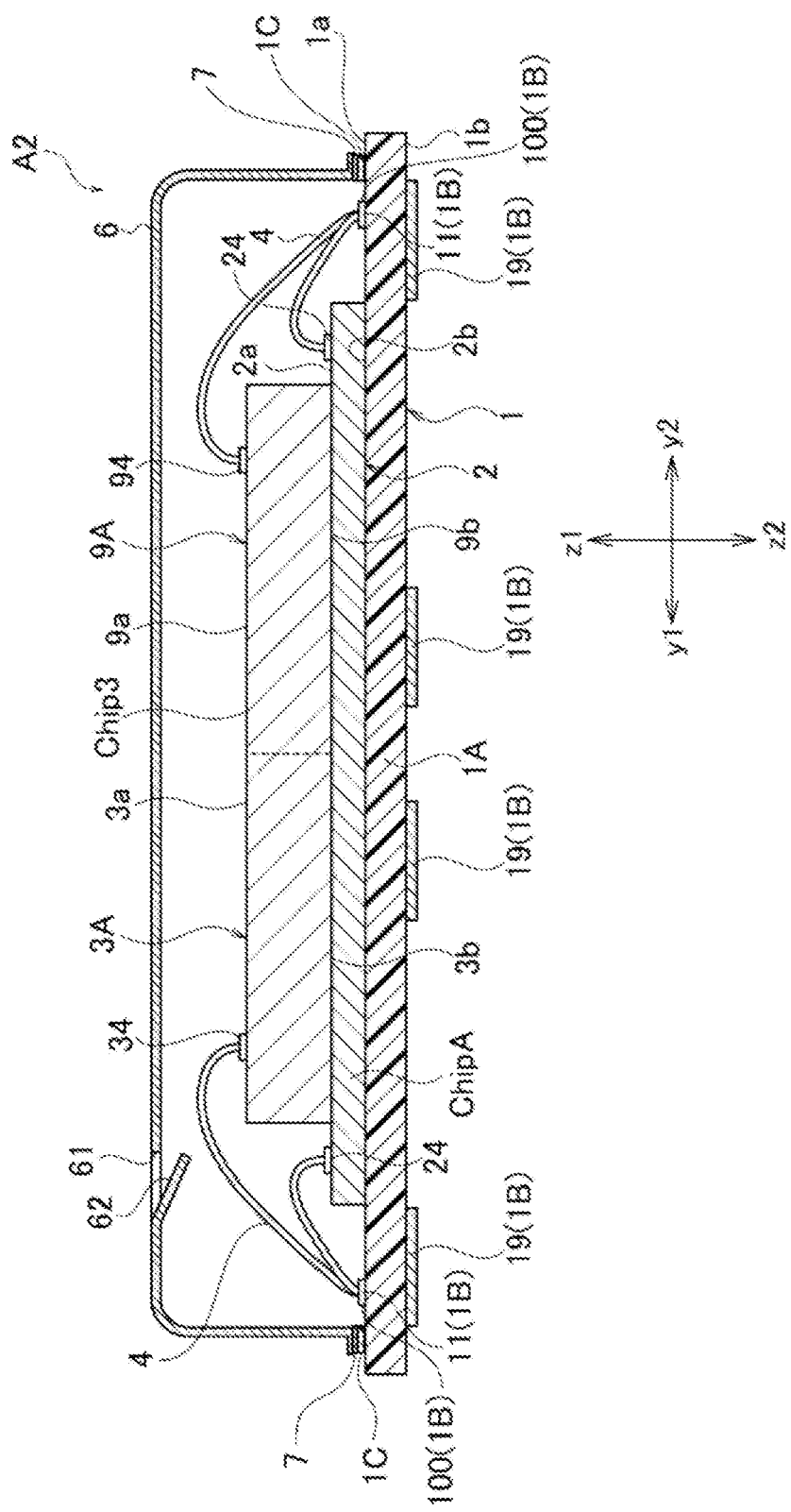
FIG. 13 is a cross-sectional view of the MEMS module taken along a line A-A in FIG. 12.

FIG. 12 is an example of a main part perspective view showing the MEMS module A2 according to the second embodiment. FIG. 13 is an example of a cross-sectional view of the MEMS module A2 taken along a line A-A in FIG. 12.

The difference between the MEMS module A2 according to the second embodiment and the MEMS module A1 according to the first embodiment is that, as shown in FIGS. 12 and 13, the substrate 30A including the first and second MEMS elements 3A and 9A of the MEMS module A2 according to the second embodiment is formed on the same chip component Chip 3. The number of the MEMS elements may be three or more.

In the second embodiment, the points common to the first embodiment (e.g., the substrate 1, the electronic component 2, the plurality of wirings 4, the cover 6, and the bonding material 7) refer to the first embodiment. The differences will be described below.

Figure 14:
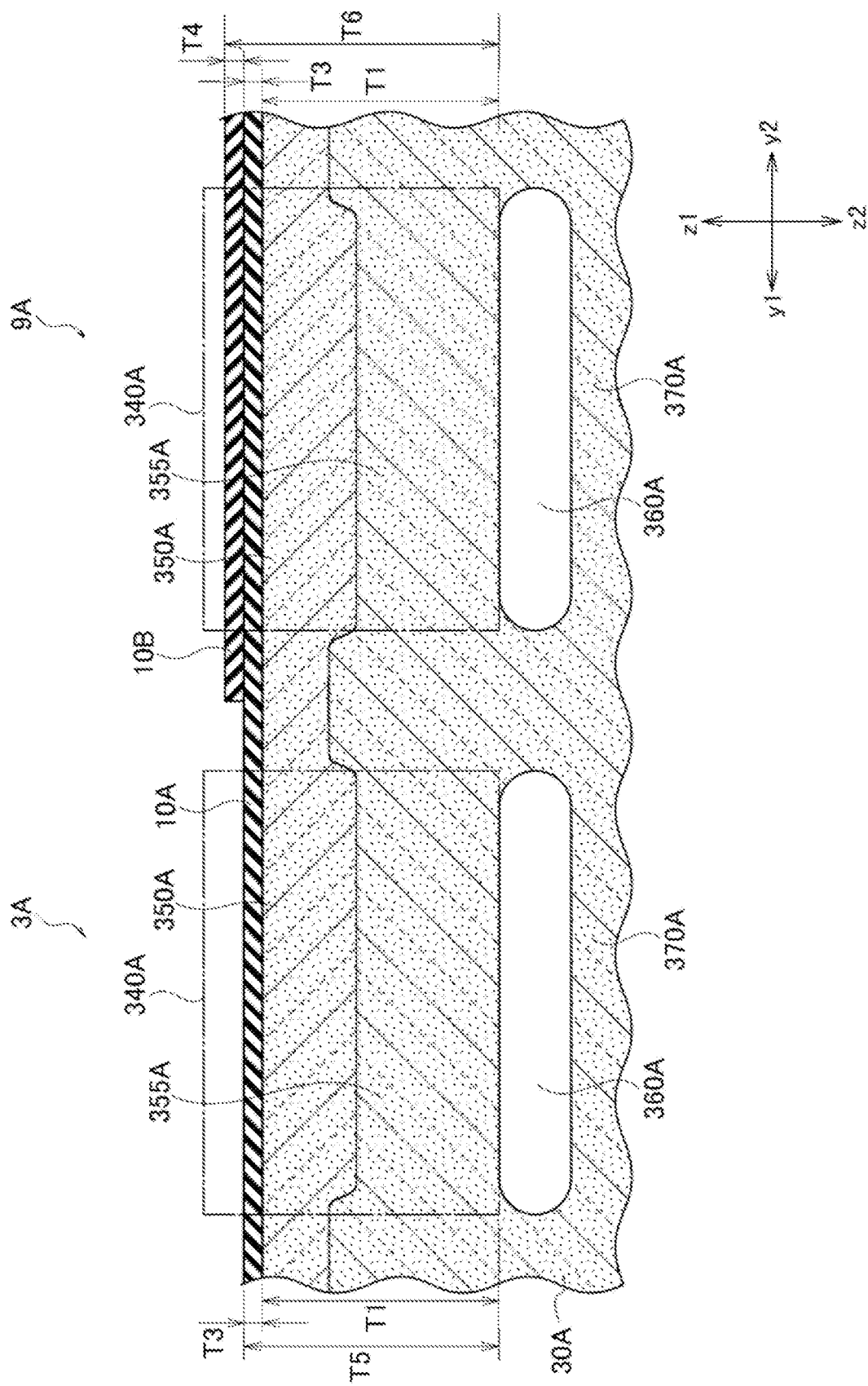
FIG. 14 is a cross-sectional view of the first and second MEMS elements shown in FIG. 12.

FIG. 14 is a cross-sectional view of first and second MEMS elements 3A and 9A.

As in the first embodiment, the substrate 30A including the first and second MEMS elements 3A and 9A includes a movable portion 340A, a hollow portion 360A, and a fixed portion 370A, as shown in FIG. 14. Further, the movable portions 340A of each of the first MEMS element 3A and the second MEMS element 9A includes a protective film 10A existing in the z1 direction of the film formation portion 350A. Further, the movable portion 340A of the second MEMS element 9A includes a protective film 10B existing in the z1 direction of the protective film 10A. As shown in FIG. 13, the film thickness of the protective film 10A is T3. The film thickness of the protective film 10B is T4. That is, the film thickness T5 of the movable portion 340A of the first MEMS element 3A is a film thickness obtained by adding the total film thickness T1 of the upper layer portion 355 and the film formation portion 350 and the film thickness T3 of the protective film 10A. Further, the film thickness T6 of the movable portion 340A of the second MEMS element 9A is a film thickness obtained by adding the total film thickness T1 of the upper layer portion 355 and the film formation portion 350, the film thickness T3 of the protective film 10A and the film thickness T4 of the protective film 10B. Examples of the protective films 10A and 10B include a silicon oxide film and a silicon nitride film.

By stacking the protective film 10B on the surface facing the z1 direction from the first MEMS element 3A, the second MEMS element 9A is formed so that the film thickness T6 of the movable portion 340A of the second MEMS element 9A becomes larger than the film thickness T5 of the movable portion 340A of the first MEMS element 3A. That is, the second MEMS element 9A can detect a higher air pressure than the first MEMS element 3A.

Next, a method of manufacturing the MEMS module A2 will be described. In the following description, a method of manufacturing the first and second MEMS elements 3A and 9A will be described.

First, a substrate 30A (not shown) including a semiconductor layer is provided. Examples of the semiconductor layer include a silicon layer. The thickness of the substrate 30A is, for example, about 700 to 800 µm.

Figure 15:
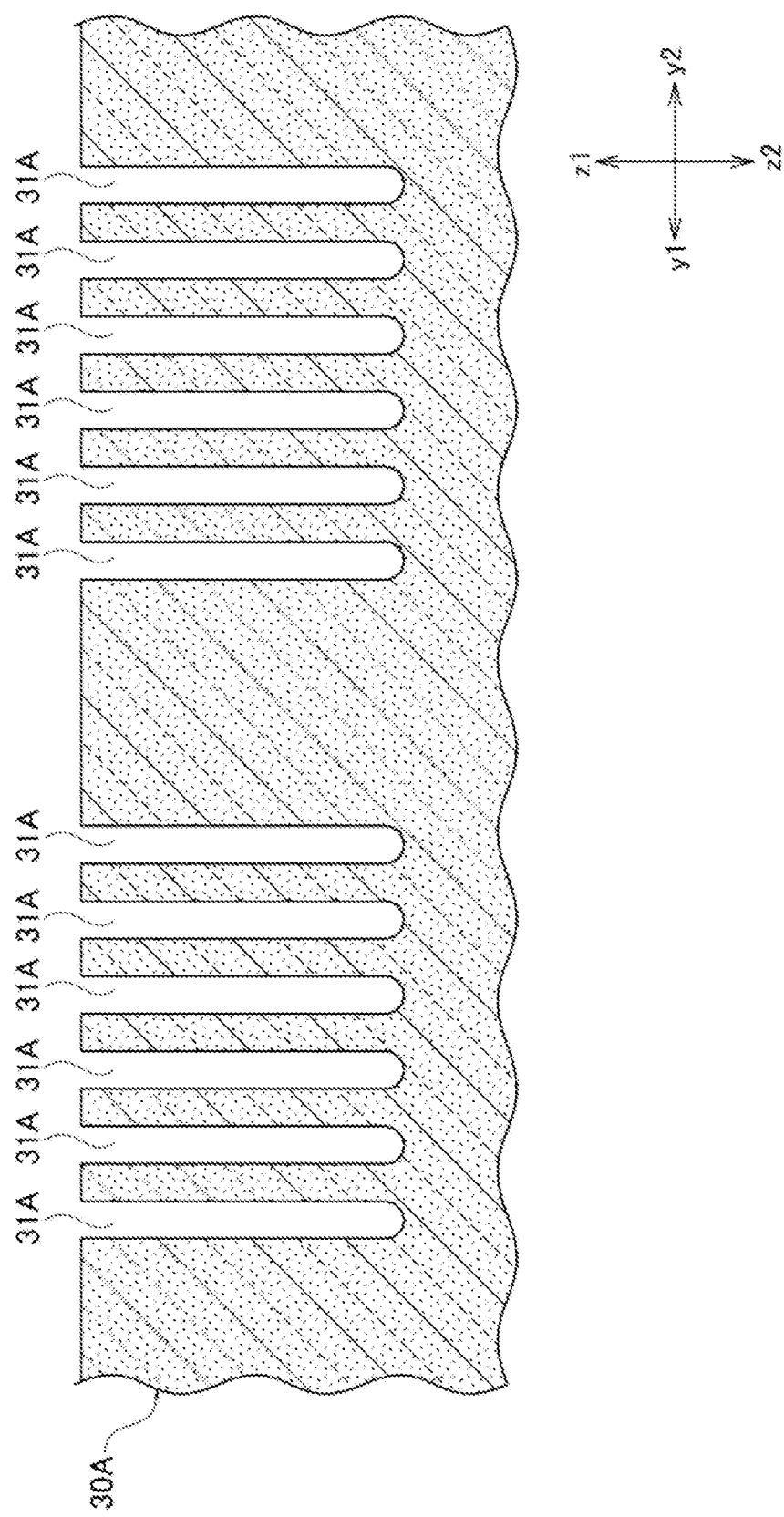
FIG. 15 is a cross-sectional view (first cross-sectional view) showing a MEMS element manufacturing method according to the second embodiment.

Next, as shown in FIG. 15, a plurality of grooves 31A is formed on the substrate 30A. The grooves 31A can be formed by, for example, deep etching such as the Bosch method or the like.

Figure 16:
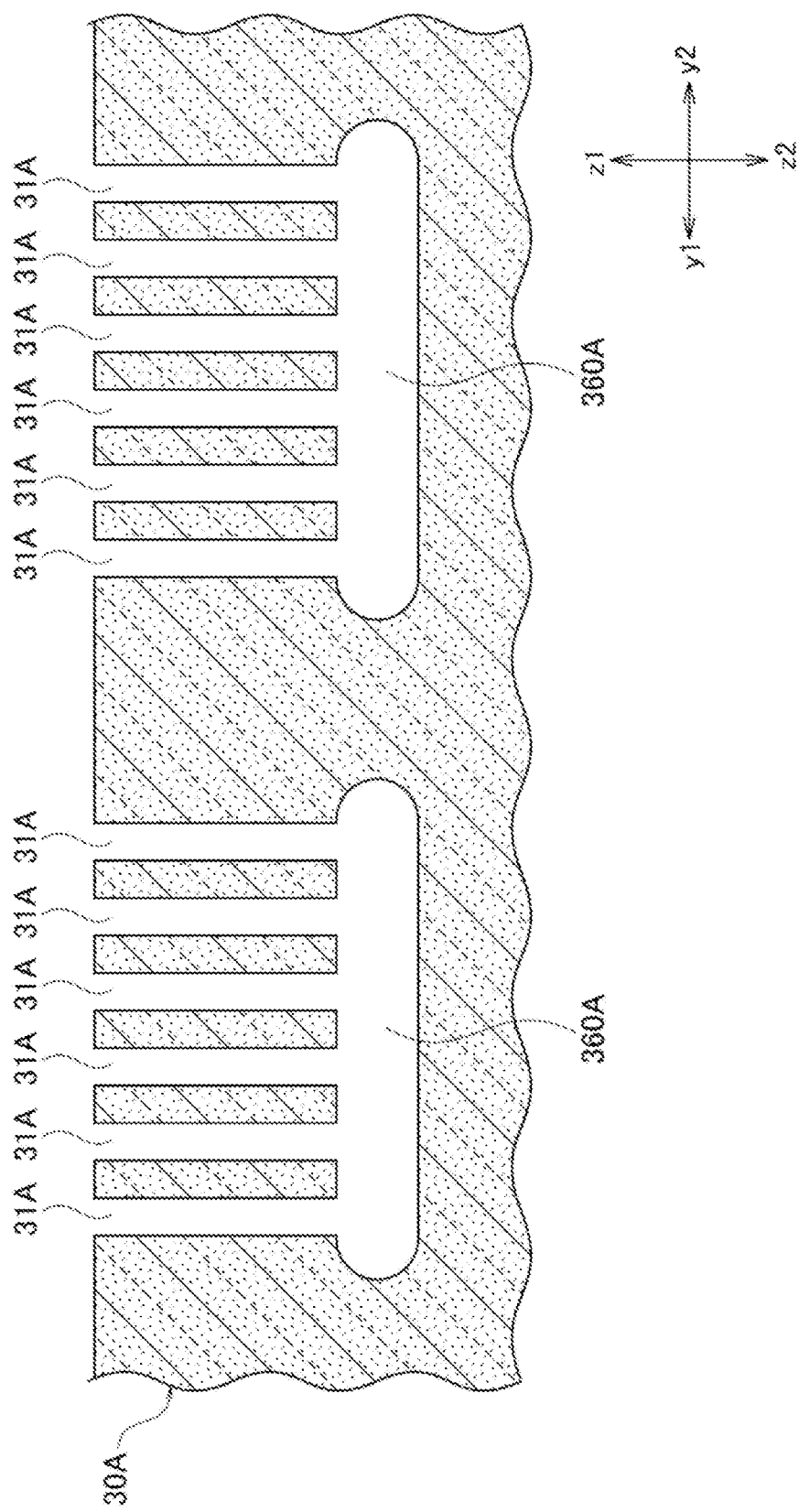
FIG. 16 is a cross-sectional view (second cross-sectional view) showing the MEMS element manufacturing method according to the second embodiment.

Next, as shown in FIG. 16, the substrate 30 is etched from the bottom surfaces of the grooves 31A in a direction perpendicular to the depth direction of the grooves to form a hollow portion 360A connecting the plurality of grooves 31A.

Figure 17:
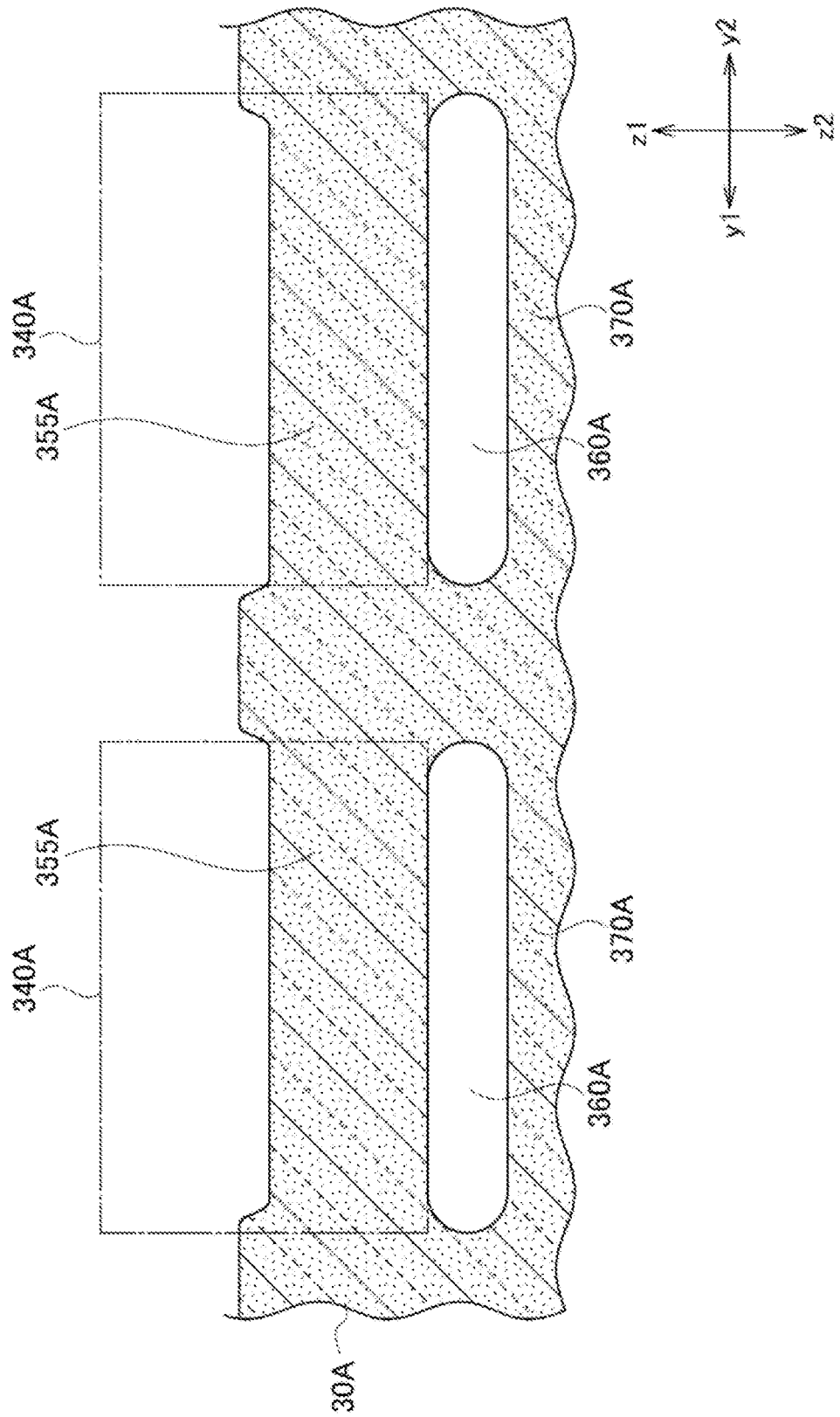
FIG. 17 is a cross-sectional view (third cross-sectional view) showing the MEMS element manufacturing method according to the second embodiment.

Next, as shown in FIG. 17, the substrate 30A is heat-treated (at, for example, 1100 to 1200 degrees C.) in an atmosphere containing hydrogen to form an upper layer portion 355A which is a portion of the movable portion 340A.

Figure 18:
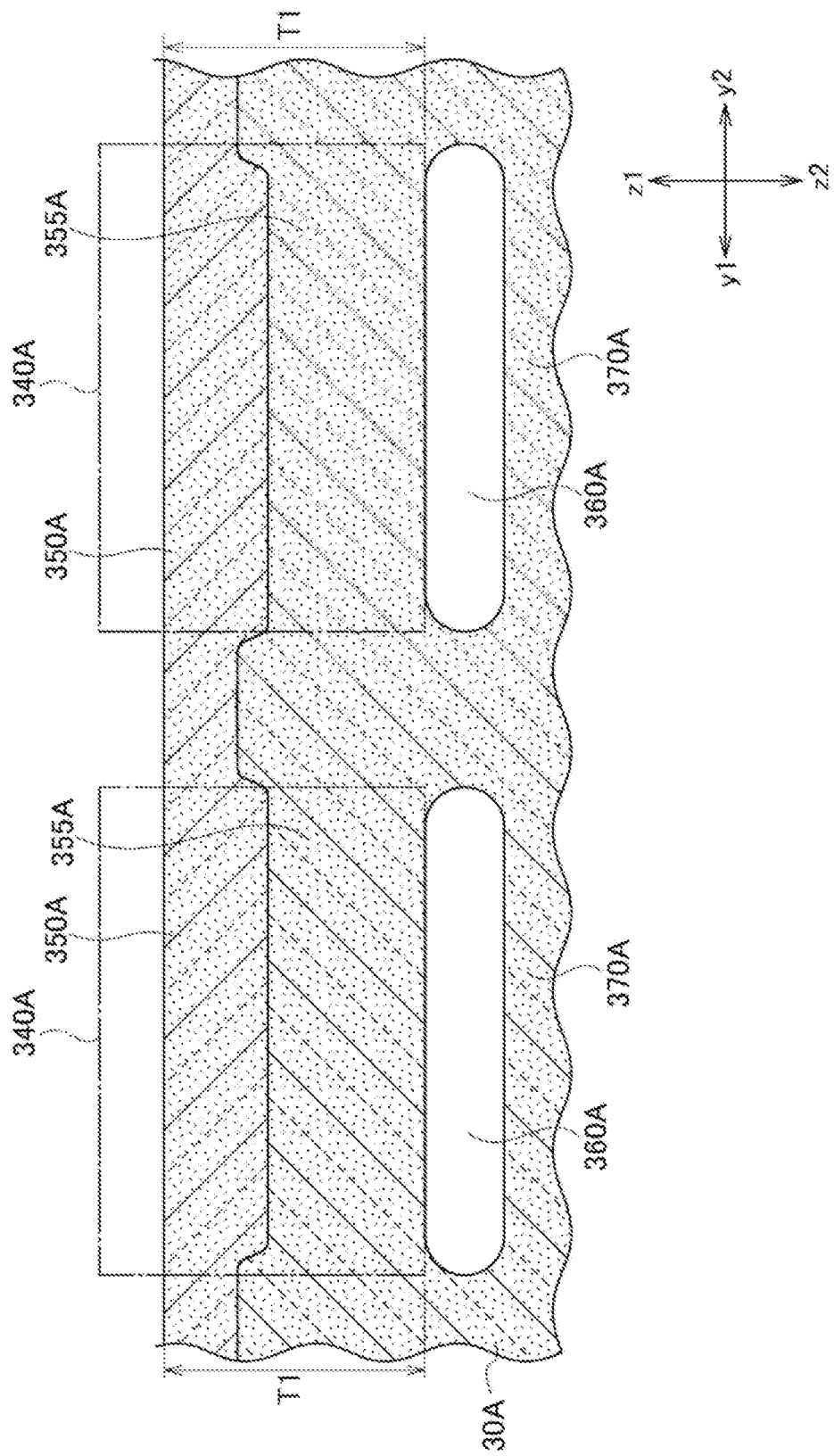
FIG. 18 is a cross-sectional view (fourth cross-sectional view) showing the MEMS element manufacturing method according to the second embodiment.

Next, as shown in FIG. 18, a film formation portion 350A is formed on the main surface of the substrate 30A facing the z1 direction. As the film formation portion 350A, for example, a silicon layer deposited by a CVD method may be used. That is, by depositing the semiconductor layer, the semiconductor layer of the first and second MEMS elements is made thick. In the present embodiment, the film thicknesses of the film formation portions 350A of the first and second MEMS elements 3A and 9A are the same. That is, the film thicknesses T1 of the upper layer portions 355A and the film formation portions 350A of the first and second MEMS elements 3A and 9A are the same. The film thickness of the film formation portion 350A of the second MEMS element 9A may be larger than that of the film formation portion 350A of the first MEMS element 3A.

Further, as shown in FIG. 14, a protective film 10A or 10B which is a portion of the movable portion 340A is formed in the thickness direction of the film formation portion 350A. Specifically, the protective film 10A is formed in the thickness direction of the film formation portion 350A. Next, for example, the first MEMS element 3A is masked with a resist, and the protective film 10B is stacked on the second MEMS element 9A. Therefore, the film thickness T6 of the movable portion 340 of the second MEMS element 9A is larger than the film thickness T5 of the movable portion 340 of the first MEMS element 3A. As a result, the first and second MEMS elements 3A and 9A have different film thicknesses, which are the shapes of the movable portions 340. Therefore, it is possible to detect air pressures in different pressure ranges with high accuracy.

By the above steps, the first and second MEMS elements 3A and 9A can be manufactured. Further, after manufacturing the first and second MEMS elements 3A and 9A, the substrate 30A including the first and second MEMS elements 3A and 9A can be made into the same chip component Chip 3.

Next, as shown in FIG. 13, an electronic component 2 is mounted on the substrate 1, and the same chip component Chip 3 including the first and second MEMS elements 3A and 9A is mounted on the electronic component 2. Further, wirings 4 for electrically connecting the electrode pads 11 of the substrate 1, the electrode pads 24 of the electronic component 2, the electrode pads 34 of the first MEMS element 3A, and the electrode pads 94 of the second MEMS element 9A are formed. Finally, the cover 6 and the substrate 1 are bonded by a bonding material 7. The electronic component 2 may be formed on the substrate 30A, or may be formed as a chip component Chip A by using a substrate in which a semiconductor wafer for an electronic component is converted into a chip, separately from the semiconductor wafer on which the first and second MEMS elements 3A and 9A are formed.

By the above steps, a MEMS module A2 can be manufactured. In the MEMS module A2, a plurality of different MEMS elements (e.g., the first MEMS element 3A and the second MEMS element 9A) whose movable portions 340A have portions of large thicknesses is provided in one chip component. Therefore, it is possible to detect a high air pressure by increasing the film thickness of the movable portion 340 and to detect air pressures in different pressure ranges without reducing the accuracy of detection of air pressures in a low air pressure range. Further, since the structural difference between the first and second MEMS elements 3A and 9A is the film thicknesses of the protective film 10B which is a portion of the movable portion 340, it is possible to easily form a plurality of MEMS elements (e.g., the first MEMS element 3A and the second MEMS element 9A) by forming the protective films at different film thicknesses in the step of forming the protective films of the plurality of MEMS elements.

As for an example of the operation of the second MEMS module A2, the above description on the operation of the MEMS module A1 can be referred to.

Third Embodiment

A MEMS module A3 according to a third embodiment of the present disclosure will be described.

Figure 19:
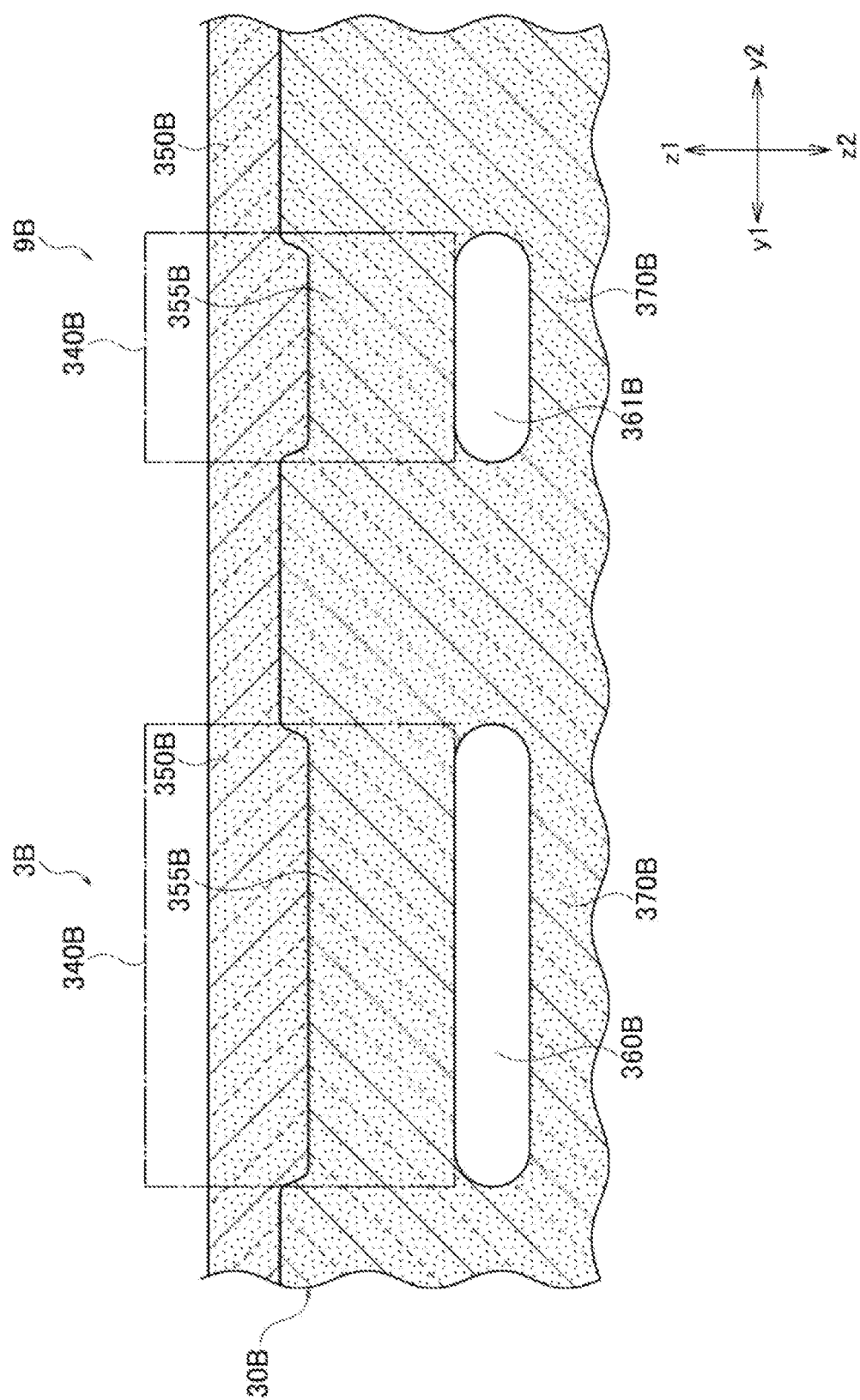
FIG. 19 is a cross-sectional view showing a MEMS element according to a third embodiment of the present disclosure.
Figure 20:
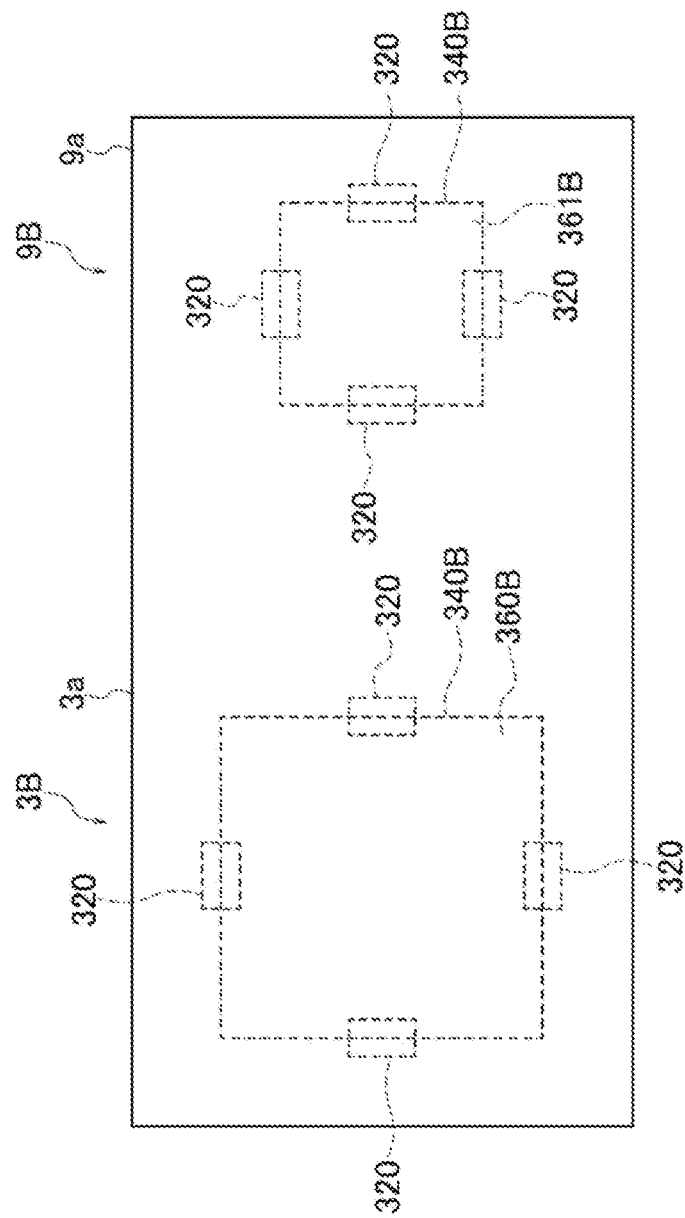
FIG. 20 is a plan view showing first and second MEMS elements according to the third embodiment.

FIG. 19 is a cross-sectional view showing first and second MEMS elements 3B and 9B of a MEMS module A3. FIG. 20 is an example of a plan view showing the first and second MEMS elements 3B and 9B.

The difference between the MEMS module A3 according to the third embodiment and the MEMS module A2 according to the second embodiment is that, as shown in FIG. 19, the hollow portion 361B of the second MEMS element 9B is narrower in the y direction than the hollow portion 360B of the first MEMS element 3B. Similarly, although not shown, the hollow portion 361B of the second MEMS element 9B is also narrower in the x direction than the hollow portion 360B of the first MEMS element 3B. As shown in FIG. 20, the hollow portion 361B of the second MEMS element 9B has a smaller area when viewed in the z direction than the hollow portion 360B of the first MEMS element 3B. The movable portion 340B of the second MEMS element 9B has a smaller area than the movable portion 340B of the first MEMS element 3B. The movable portion 340B of the second MEMS element 9B can detect a high air pressure by reducing the area of the movable portion 340B of the first MEMS element 3B. Moreover, there is no protective film 10A or 10B. Alternatively, there may be a protective film 10A or 10B.

In the third embodiment, as for the points common to the first and second embodiments (e.g., the substrate 1, the electronic component 2, the plurality of wirings 4, the cover 6, and the bonding material 7), the first and second embodiments are referred to. That is, in the MEMS module A3 according to the third embodiment, just like the MEMS module A2 according to the second embodiment, as shown in FIG. 19, the first and second MEMS elements 3B and 9B are formed on the substrate 30B. Further, in the MEMS module A3 according to the third embodiment, as shown in FIG. 12, a plurality of MEMS elements is formed in one chip component Chip 3. The number of MEMS elements may be three or more. The differences will be described below.

As shown in FIG. 19, just like the first and second embodiments, the substrate 30B includes a movable portion 340B, hollow portions 360B and 361B, and a fixed portion 370B. The movable portion 340B includes an upper layer portion 355B and a film formation portion 350B. A protective film may be provided in the z1 direction of the film formation portion 350B.

Next, a method of manufacturing the MEMS module A3 will be described. In the following description, a method of manufacturing the first and second MEMS elements 3B and 9B will be described.

First, a substrate 30B (not shown) including a semiconductor layer is provided. Examples of the semiconductor layer include a silicon layer. The thickness of the substrate 30B is, for example, about 700 to 800 μm.

Figure 21:
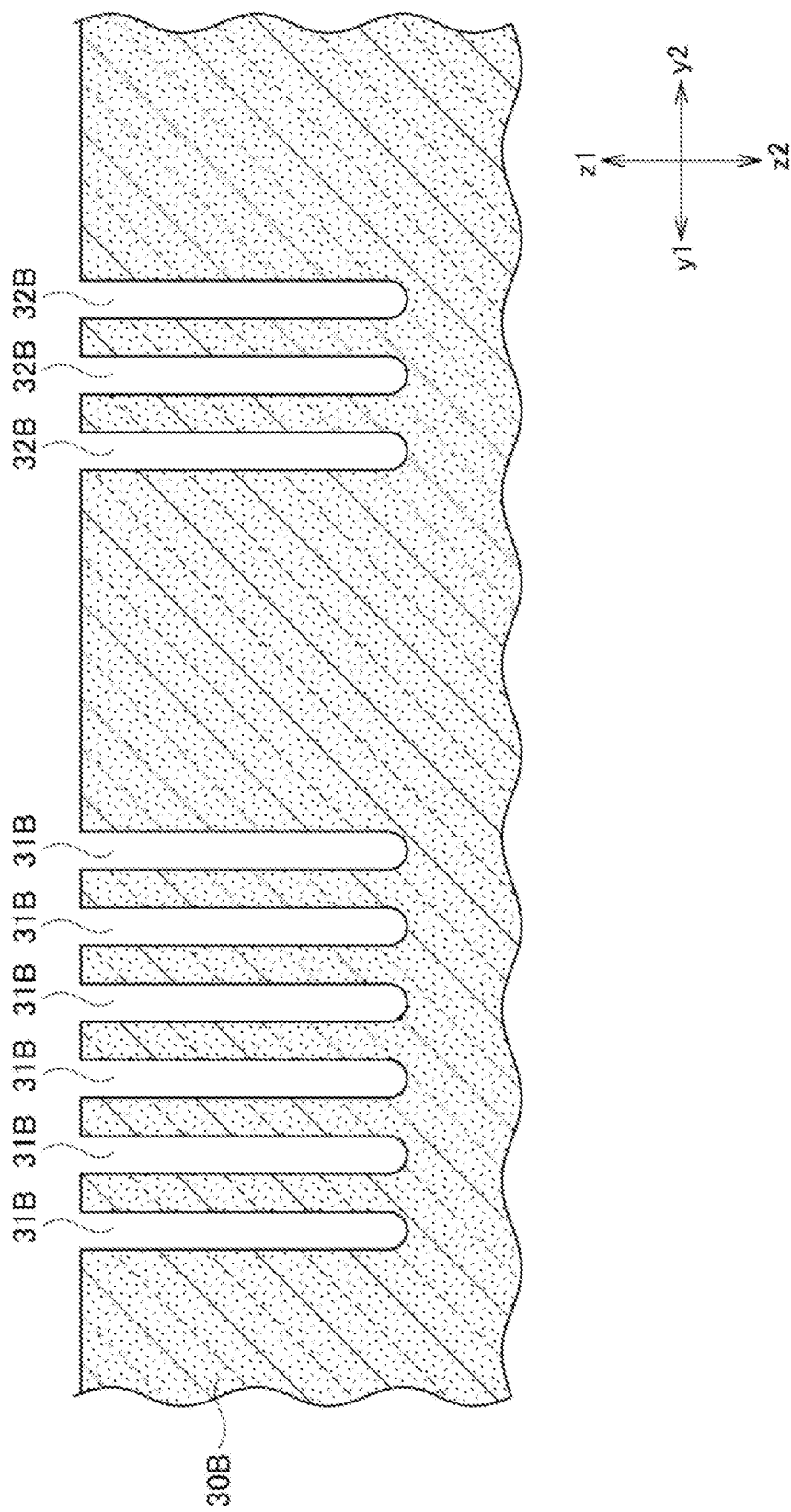
FIG. 21 is a cross-sectional view (first cross-sectional view) showing a MEMS element manufacturing method according to the third embodiment.

Next, as shown in FIG. 21, a plurality of grooves 31B and 32B is formed on the substrate 30B. The grooves 31B and 32B can be formed by deep etching such as, for example, the Bosch method or the like. The number of grooves 32B constituting the second MEMS element 9B is smaller than the number of grooves 31B constituting the first MEMS element 3B.

Figure 22:
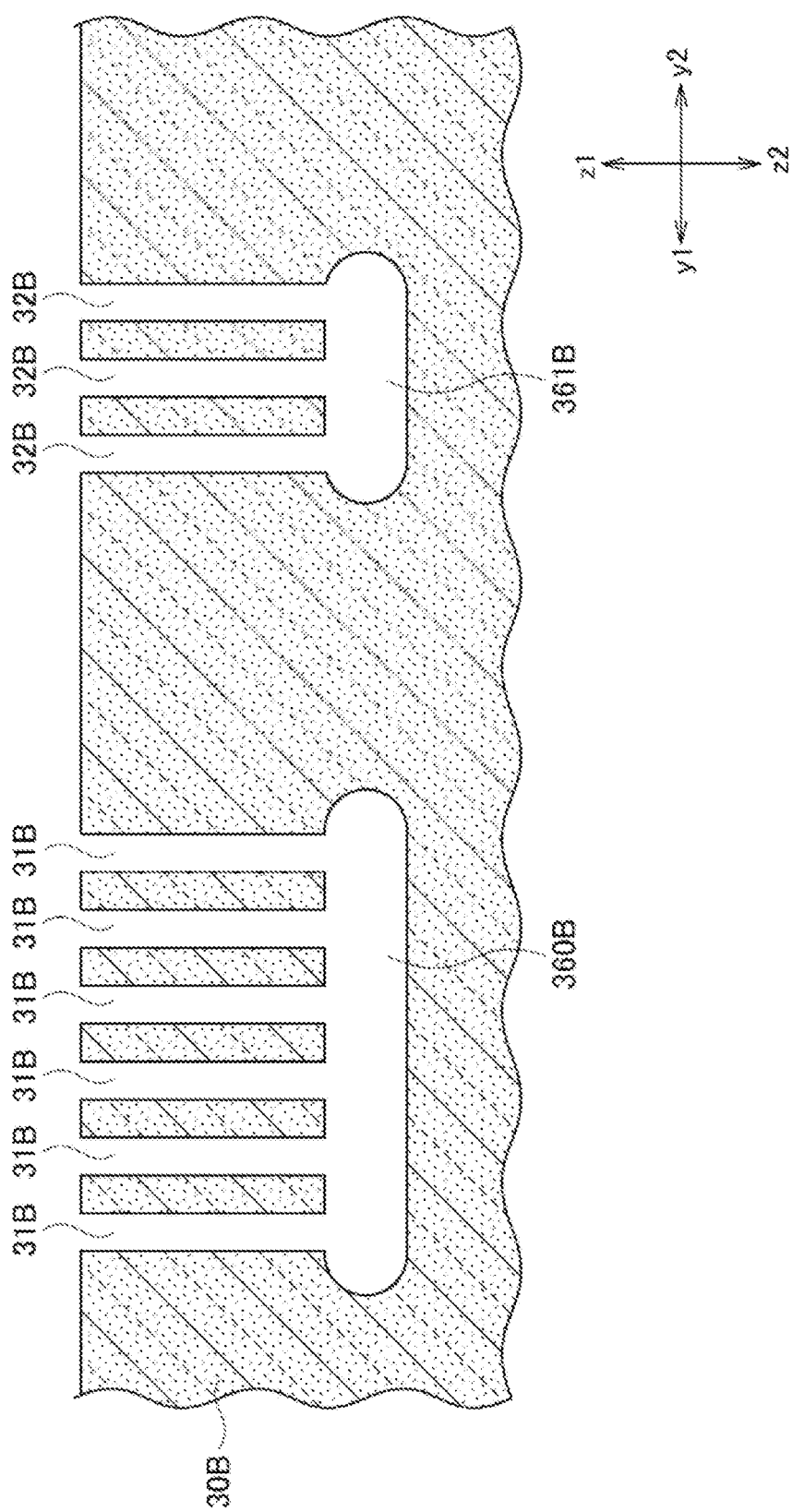
FIG. 22 is a cross-sectional view (second cross-sectional view) showing the MEMS element manufacturing method according to the third embodiment.

Next, as shown in FIG. 22, the substrate 30B is etched from the bottom surfaces of the grooves 31B and 32B in a direction perpendicular to the depth direction of the grooves to form hollow portions 360B and 361B connecting the adjacent grooves.

Figure 23:
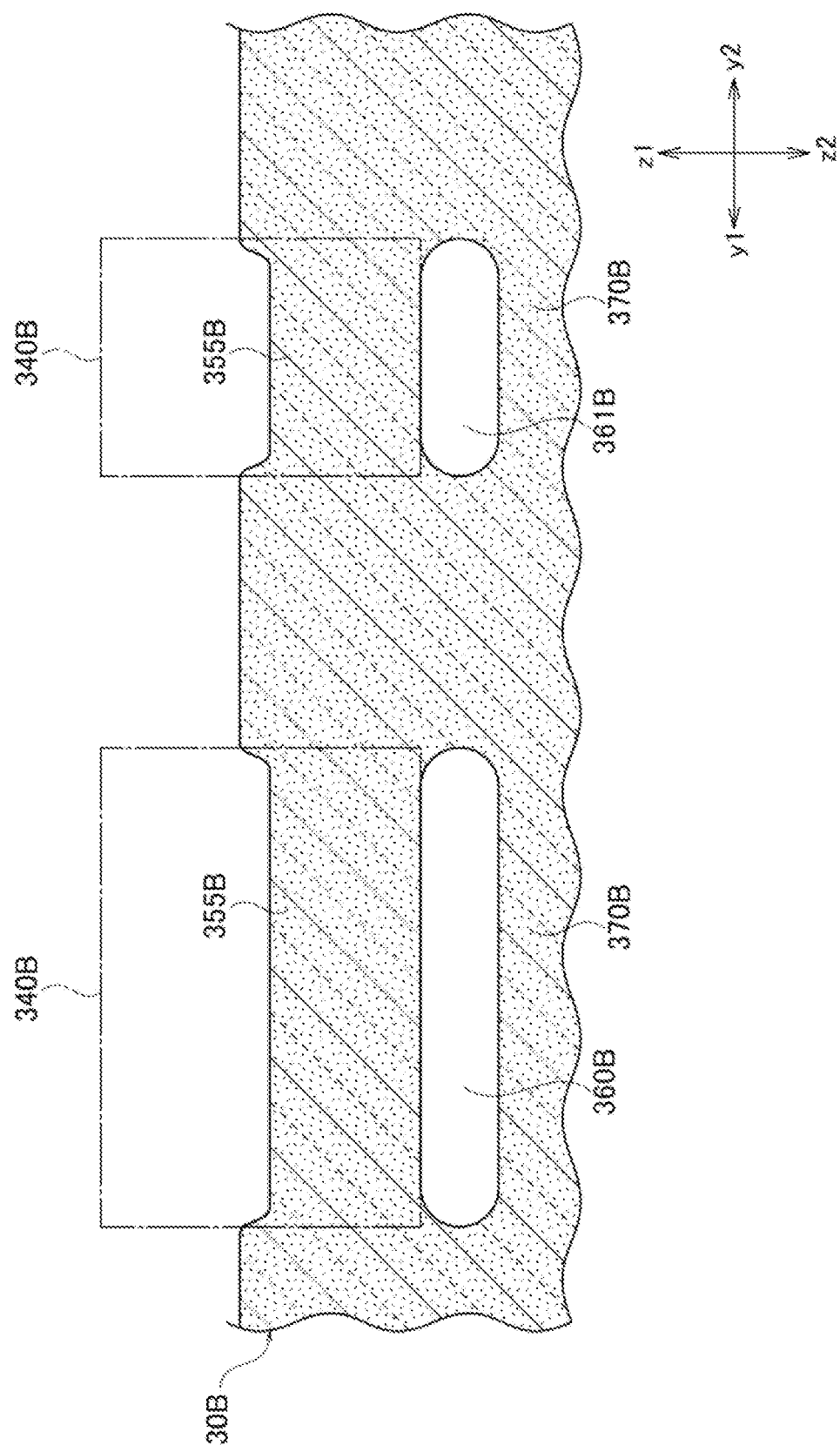
FIG. 23 is a cross-sectional view (third cross-sectional view) showing the MEMS element manufacturing method according to the third embodiment.

Next, as shown in FIG. 23, the substrate 30B is heat-treated (at, e.g., 1100 to 1200 degrees C.) in an atmosphere containing hydrogen to form an upper layer portion 355B which is a portion of the movable portion 340B.

Next, as shown in FIG. 19, the film formation portion 350B is formed on the main surface of the substrate 30B facing the z1 direction. As the film formation portion 350B, for example, a silicon layer deposited by a CVD method may be used. That is, by depositing the semiconductor layer, the semiconductor layer of the first and second MEMS elements 3B and 9B is made thick. In the present embodiment, the film thicknesses of the film formation portions 350B of the first and second MEMS elements 3B and 9B are the same. That is, the film thicknesses T1 of the upper layer portions 355B and the film formation portions 350B of the first and second MEMS elements 3B and 9B are the same. Therefore, the hollow portion 360B of the second MEMS element 9B is narrower and smaller in area than the hollow portion 361B of the first MEMS element 3B. As a result, the first and second MEMS elements 3B and 9B differ in the area of the movable portion 340 thereof. Therefore, the first and second MEMS elements 3B and 9B can detect air pressures in different pressure ranges with high accuracy. The film thickness of the film formation portion 350B of the second MEMS element 9B may be larger than the film thickness of the film formation portion 350B of the first MEMS element 3B.

By the above steps, the first and second MEMS elements 3B and 9B can be manufactured. Further, after manufacturing the first and second MEMS elements 3B and 9B, the substrate 30B including the first and second MEMS elements 3B and 9B can be made into the same chip component Chip 3.

Next, as shown in FIG. 13, an electronic component 2 is mounted on the substrate 1, and the same chip component Chip 3 including the first and second MEMS elements 3B and 9B is mounted on the electronic component 2. Further, wirings 4 for electrically connecting the electrode pads 11 of the substrate 1, the electrode pads 24 of the electronic component 2, the electrode pads 34 of the first MEMS element 3B, and the electrode pads 94 of the second MEMS element 9B are formed. Finally, the cover 6 and the substrate 1 are bonded by a bonding material 7. The electronic component 2 may be formed on the substrate 30B, or may be formed as a chip component Chip A by using a substrate in which a semiconductor wafer for an electronic component is converted into a chip, separately from the semiconductor wafer on which the first and second MEMS elements 3B and 9B are formed.

By the above steps, a MEMS module A3 can be manufactured. In the MEMS module A3, a plurality of different MEMS elements (e.g., the first MEMS element 3B and the second MEMS element 9B) whose movable portions 340B have small areas is provided in one chip component. Therefore, it is possible to detect a high air pressure by reducing the area of the movable portion 340B and to detect air pressures in different pressure ranges without reducing the accuracy of detection of an air pressure in a low air pressure range. Further, since the structural difference between the first and second MEMS elements 3A and 9B is the area of the movable portion 340B, it is possible to easily form a plurality of MEMS elements (e.g., the first MEMS element 3B and the second MEMS element 9B) by reducing the number of grooves 32B in the step of forming the grooves 31B and 32B of the plurality of MEMS elements.

As for an example of the operation of the third MEMS module A3, the above description on the operation of the MEMS module A1 can be referred to.

Fourth Embodiment

A MEMS module A4 according to a fourth embodiment of the present disclosure will be described.

Figure 24:
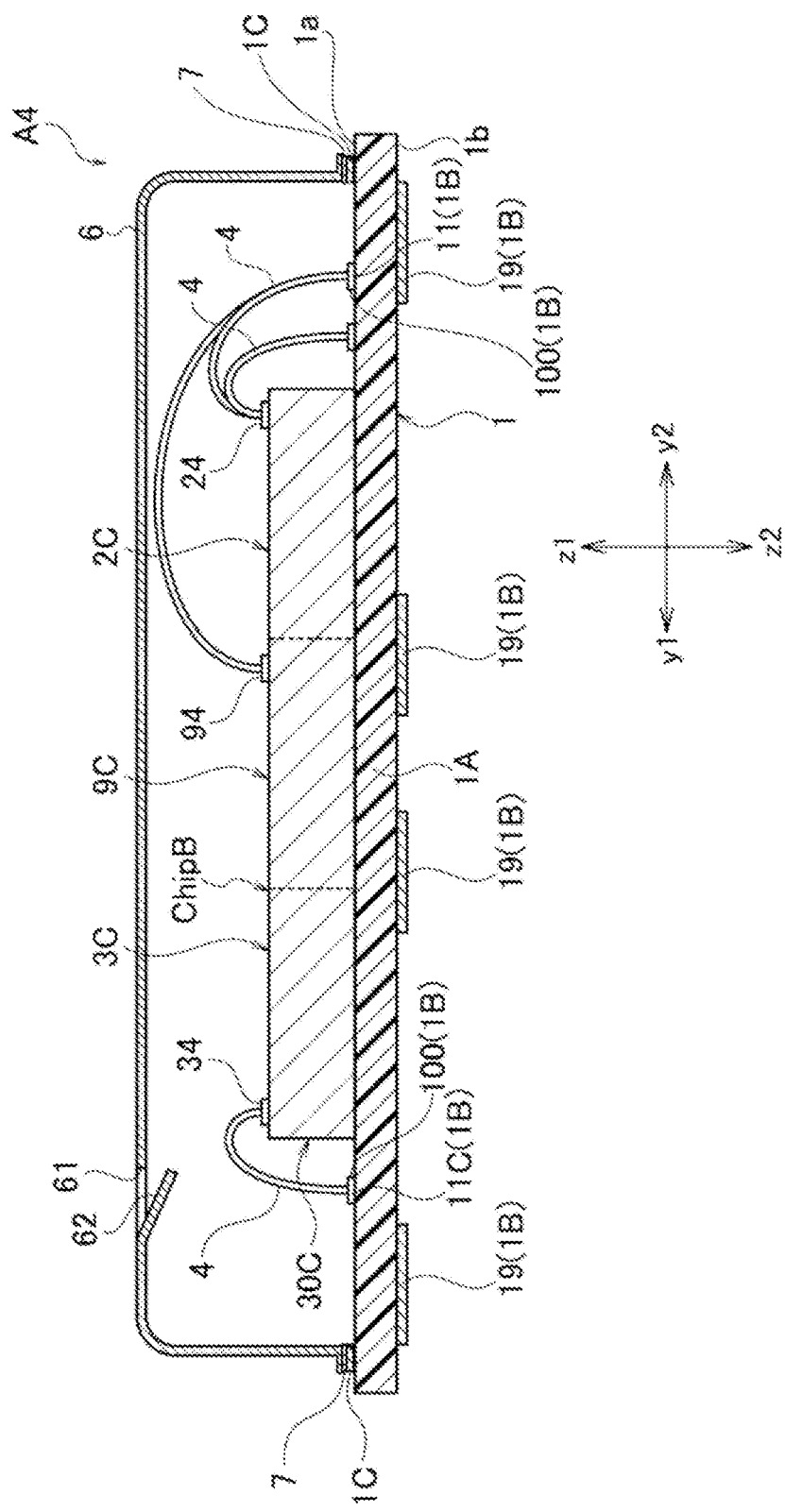
FIG. 24 is a cross-sectional view showing a MEMS module according to a fourth embodiment of the present disclosure.
Figure 25:
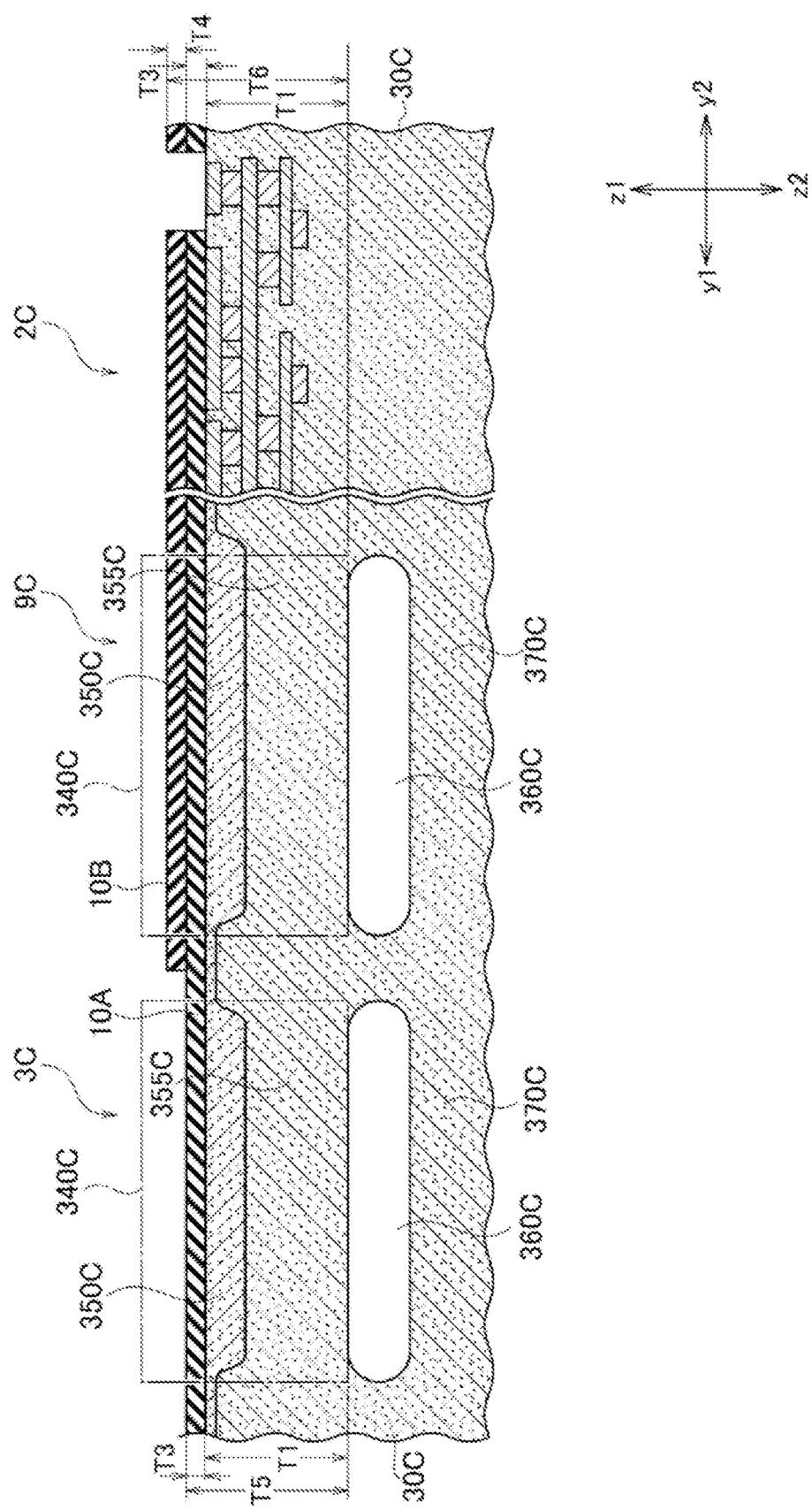
FIG. 25 is a cross-sectional view of the first and second MEMS elements and an electronic component shown in FIG. 23.

FIG. 24 is an example of a cross-sectional view of the MEMS module A4 according to the fourth embodiment taken along a line A-A. FIG. 25 is an example of a cross-sectional view of the first and second MEMS elements 3C and 9C and the electronic component 2C shown in FIG. 24.

The difference between the MEMS module A4 according to the fourth embodiment and the MEMS modules A1 to A3 according to the first to third embodiments is that, as shown in FIG. 24, the substrate 30C including the first and second MEMS elements 3C and 9C and the electronic component 2C forms the same chip component Chip B. Alternatively, the number of MEMS elements may be three or more. In the following description, the same chip component in which the first and second MEMS elements 3C and 9C and the electronic component 2C are formed on the substrate 30C will be referred to as a chip component Chip B.

In the fourth embodiment, as for the points common to the first to third embodiments (e.g., the substrate 1, the plurality of wirings 4, the cover 6, and the bonding material 7), the first to third embodiments are referred to. The differences will be described below.

The chip component Chip B is mounted on the mounting surface 1a of the substrate 1. The chip component and the substrate 1 may be physically bonded by a silicone resin, a die attachment film, or the like (not shown). A plurality of electrode pads 24, 34 and 94 is provided on the z1-direction surface of the chip component.

As shown in FIG. 25, just like the first to third embodiments, the substrate 30C constituting the first and second MEMS elements 3C and 9C and the electronic component 2C includes a movable portion 340C, a hollow portion 360C, and a fixed portion 370C. Further, the first and second MEMS elements 3C and 9C and the electronic component 2C include a protective film 10A on the z1-direction surface of the chip component. Further, the second MEMS element 9C and the electronic component 2C include a protective film 10B on the z1-direction surface of the protective film 10A. The movable portion 340C includes an upper layer portion 355C, a film formation portion 350C, and protective films 10A and 10B. The first and second MEMS elements 3C and 9C and the electronic component 2C may not include the protective film 10A.

By stacking the protective film 10B on the second MEMS element 9C rather than the first MEMS element 3C, the film thickness T6 of the movable portion 340C of the second MEMS element 9C is made larger than the film thickness T5 of the movable portion 340C of the first MEMS element 3C.

Next, a method of manufacturing the MEMS module A4 will be described. In the following description, a method of manufacturing the first and second MEMS elements 3C and 9C and the electronic component 2C will be described.

First, a substrate 30C (not shown) including a semiconductor layer is provided. Examples of the semiconductor layer include a silicon layer. The thickness of the substrate 30C is, for example, about 700 to 800 μm.

Figure 26:
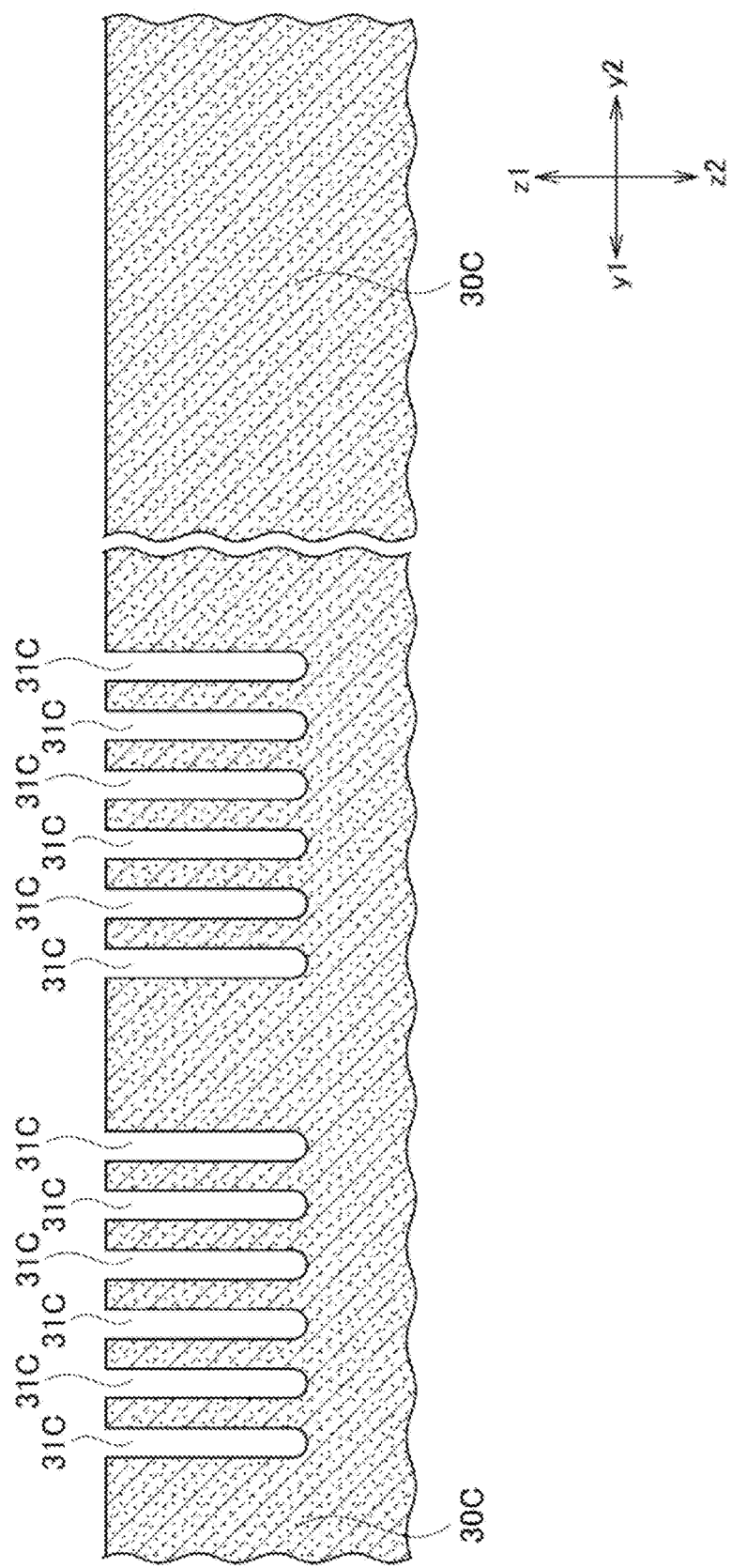
FIG. 26 is a cross-sectional view (first cross-sectional view) showing a MEMS element manufacturing method according to a fourth embodiment of the present disclosure.

Next, as shown in FIG. 26, a plurality of grooves 31C is formed on the substrate 30C. The grooves 31C can be formed by, for example, deep etching such as the Bosch method or the like.

Figure 27:
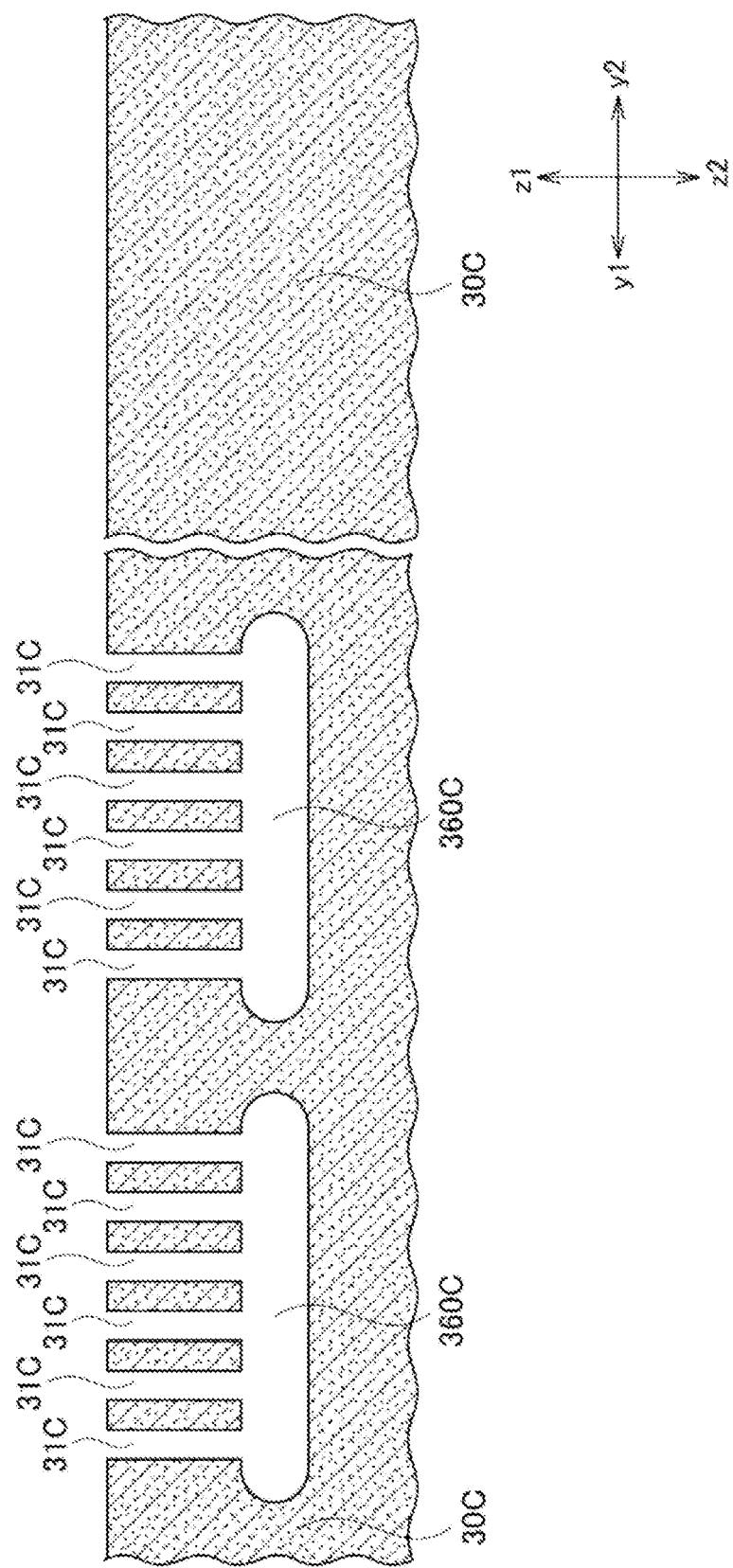
FIG. 27 is a cross-sectional view (second cross-sectional view) showing the MEMS element manufacturing method according to the fourth embodiment.

Next, as shown in FIG. 27, the substrate 30C is etched from the bottom surfaces of the grooves 31C in a direction perpendicular to the depth direction of the grooves to form a hollow portion 360C connecting the adjacent grooves.

Figure 28:
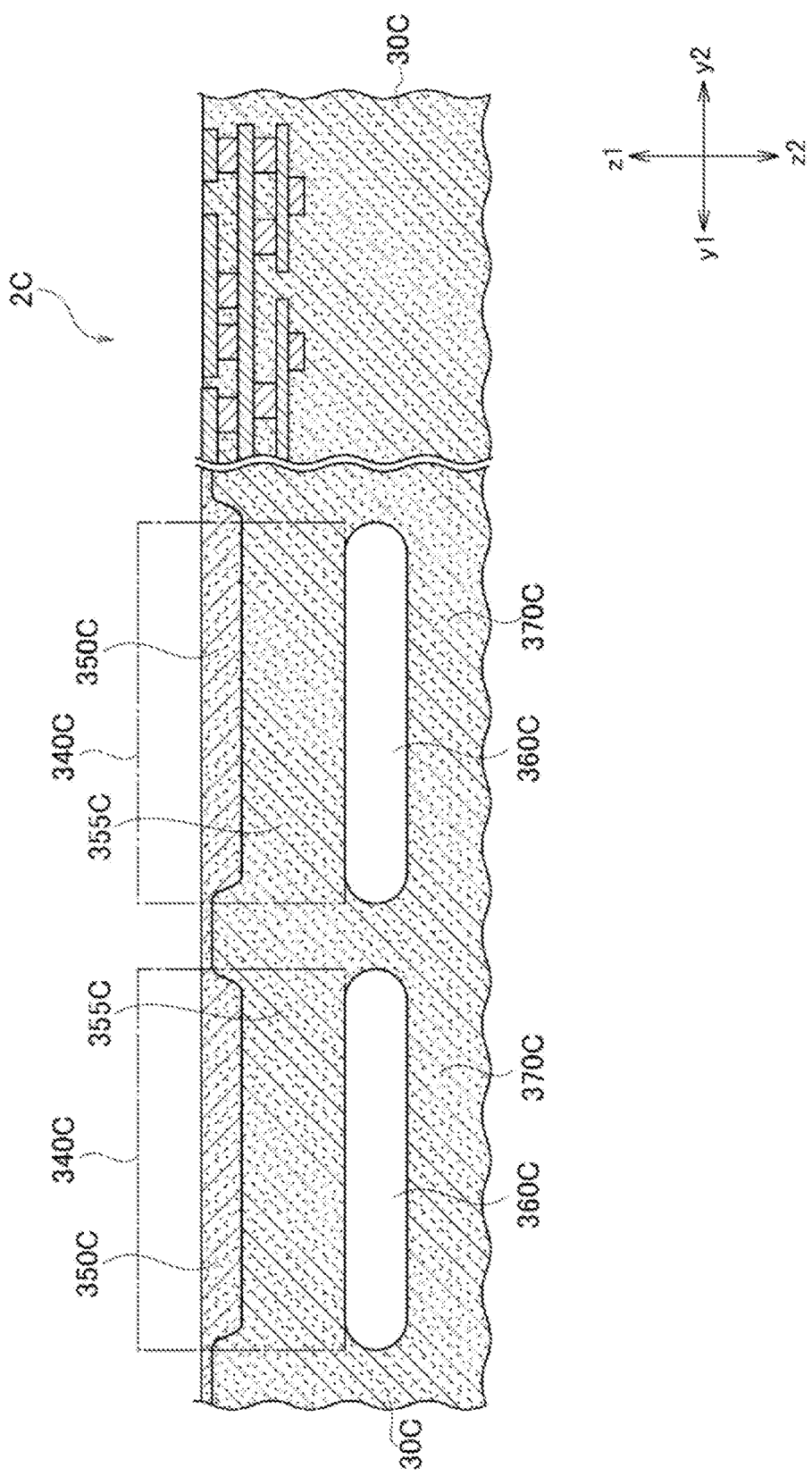
FIG. 28 is a cross-sectional view (third cross-sectional view) showing the MEMS element manufacturing method according to the fourth embodiment.

Next, as shown in FIG. 28, the substrate 30C is heat-treated (at, e.g., 1100 to 1200 degrees C.) in an atmosphere containing hydrogen to form an upper layer portion 355C which is a portion of the movable portion 340C.

Next, as shown in FIG. 25, a film formation portion 350C is formed on the main surface of the substrate 30C facing the z1 direction. As the film formation portion 350C, for example, a silicon layer deposited by a CVD method may be used. That is, by depositing the semiconductor layer, the semiconductor layer of the first and second MEMS elements 3C and 9C is made thick. In the present embodiment, the film thicknesses of the film formation portions 350C of the first and second MEMS elements 3C and 9C are the same. That is, as shown in FIG. 23, the film thicknesses T1 of the upper layer portions 355C and the film formation portions 350C of the first and second MEMS elements 3C and 9C are the same. The film thickness of the film formation portion 350C of the second MEMS element 9C may be larger than that of the film formation portion 350C of the first MEMS element 3C.

Further, as shown in FIG. 25, an electronic component 2C is formed inside the substrate 30C in a region spaced apart from the region where the first and second MEMS elements 3C and 9C are formed in the direction (y direction) perpendicular to the thickness direction of the movable portion 340C. Further, a protective film 10A or 10B, which is a portion of the movable portion 340C, is formed in the thickness direction of the film formation portion 350C. Therefore, the film thickness T6 of the movable portion 340C of the second MEMS element 9C is larger than the film thickness T5 of the movable portion 340C of the first MEMS element 3C. As a result, since the first and second MEMS elements 3C and 9C have different film thicknesses in the shape of the movable portion 340C, it is possible to accurately detect air pressures in different pressure ranges with high accuracy.

By the above steps, the first and second MEMS elements 3C and 9C and the electronic component 2C can be manufactured. Further, after manufacturing the first and second MEMS elements 3C and 9C and the electronic component 2C, the substrate 30C including the first and second MEMS elements 3C and 9C and the electronic component 2C can be made into the same chip component Chip B.

Next, as shown in FIG. 24, the same chip component Chip B including the first and second MEMS elements 3C and 9C and the electronic component 2C is mounted on the substrate 1. Further, wirings 4 for electrically connecting the electrode pads 11 of the substrate 1, the electrode pads 24 of the electronic component 2C, the electrode pads 34 of the first MEMS element 3C, and the electrode pads 94 of the second MEMS element 9C are formed. Finally, the cover 6 and the substrate 1 are bonded by a bonding material 7.

By the above steps, a MEMS module A4 can be manufactured. In the MEMS module A4, a plurality of different MEMS elements (e.g., the first MEMS element 3C and the second MEMS element 9C) whose movable portions 340A have large thicknesses, and an electronic component 2C are provided in one chip component. Therefore, it is possible to detect a high air pressure by increasing the film thickness of the movable portion 340C and to accurately detect air pressures in different pressure ranges without reducing the accuracy of detection of an air pressure in a low air pressure range. Further, since the structural difference between the first and second MEMS elements 3C and 9C is the film thicknesses of the movable portion 340C, it is possible to easily form a plurality of MEMS elements (e.g., the first MEMS element 3C and the second MEMS element 9C) by forming the protective films with different thick films in the step of forming the protective film of the plurality of MEMS elements.

As for an example of the operation of the MEMS module A4 according to the fourth embodiment, the above description on the operation of the MEMS module A1 can be referred to.

Fifth Embodiment

A MEMS module A5 according to a fifth embodiment of the present disclosure will be described.

Figure 29:
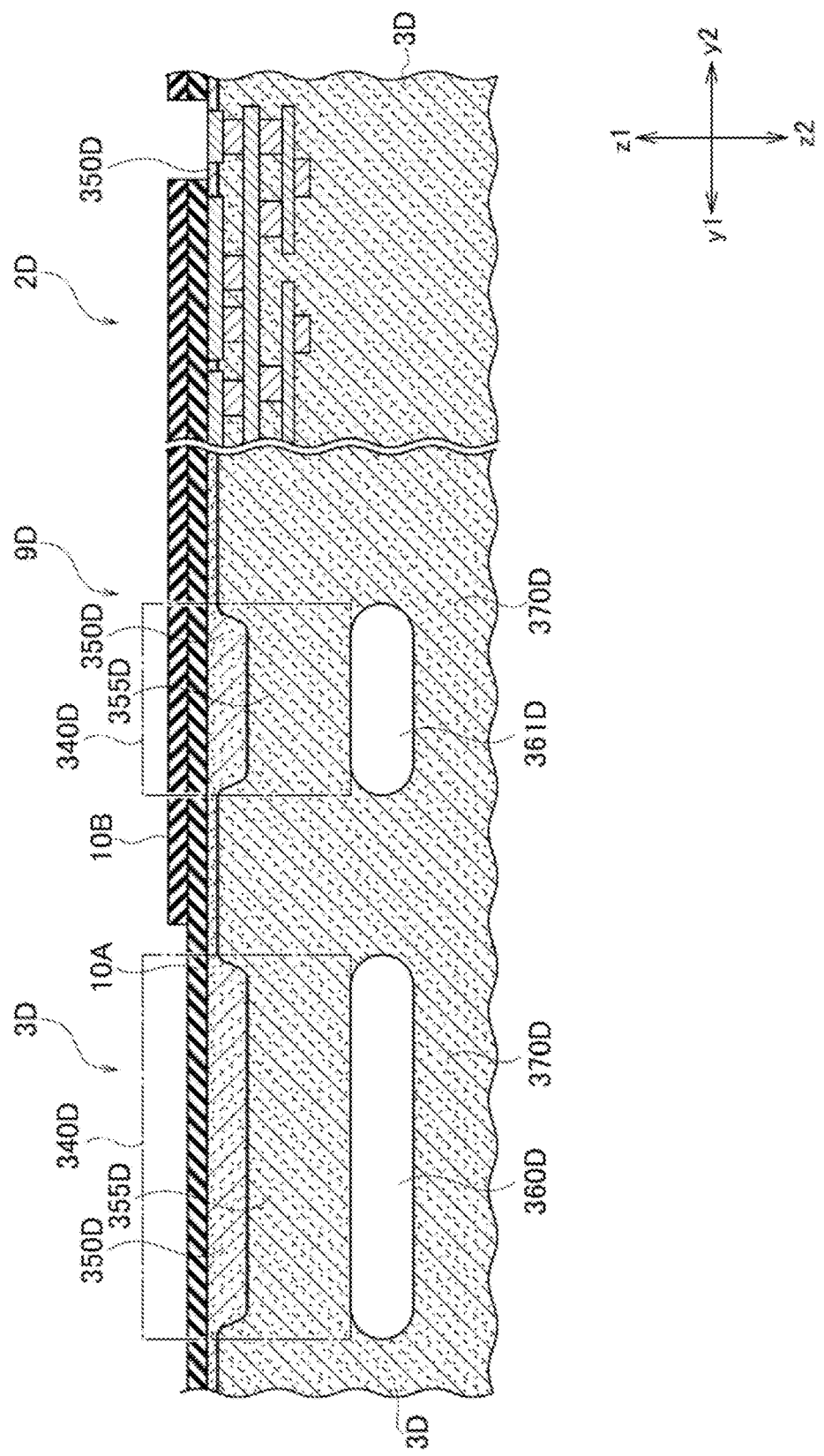
FIG. 29 is a cross-sectional view showing a MEMS element according to a fifth embodiment of the present disclosure.

FIG. 29 is an example of a cross-sectional view showing first and second MEMS elements 3D and 9D and an electronic component 2D of the MEMS module A5.

The difference between the MEMS module A5 according to the fifth embodiment and the MEMS module A4 according to the fourth embodiment is that, as shown in FIG. 29, the hollow portion 361D of the second MEMS element 9D is narrower in the y direction than the hollow portion 360D of the first MEMS element 3D. Similarly, although not shown, the hollow portion 361D of the second MEMS element 9D is narrower in the x direction than the hollow portion 360D of the first MEMS element 3D. Further, although not shown, the hollow portion 361D of the second MEMS element 9D is smaller in area than the hollow portion 360D of the first MEMS element 3D when viewed in the z direction. That is, the movable portion 340D of the second MEMS element 9D has a smaller area than the movable portion 340D of the first MEMS element 3D. The movable portion 340D of the second MEMS element 9D can detect a high air pressure by reducing the area of the movable portion 340D of the first MEMS element 3D. The number of MEMS elements may be three or more.

In the fifth embodiment, as for the points common to the fourth embodiment (e.g., the substrate 1, the plurality of wirings 4, the cover 6, and the bonding material 7), the fourth embodiment is referred to. The differences will be described below.

As in the fourth embodiment, the substrate 30D including the first and second MEMS elements 3D and 9D and the electronic component 2D is included in, for example, the same chip component Chip B.

As shown in FIG. 29, each of the first and second MEMS elements 3D and 9D includes a movable portion 340D, a hollow portion 360D or 361D, and a fixed portion 370D, as in the fourth embodiment. The movable portion 340D includes an upper layer portion 355D, a film formation portion 350D, and a protective film 10A or 10B.

Next, a method of manufacturing the MEMS module A5 will be described. In the following description, a method of manufacturing the first and second MEMS elements 3D and 9D and the electronic component 2D will be described.

First, a substrate 30D (not shown) including a semiconductor layer is provided. Examples of the semiconductor layer include a silicon layer. The thickness of the substrate 30D is, for example, about 700 to 800 μm.

Next, as shown in FIG. 30, a plurality of grooves 31D and 32D is formed on the substrate 30D. The grooves 31D and 32D can be formed by deep etching such as, for example, the Bosch method or the like. For example, the number of grooves 32D constituting the second MEMS element 9D is smaller than the number of grooves 31D constituting the first MEMS element 3D. The number of grooves is for changing the area of the hollow portions of the plurality of MEMS elements, and is not limited to reducing the number of grooves.

Next, as shown in FIG. 31, the substrate 30D is etched from the bottom surfaces of the grooves 31D and 32D in a direction perpendicular to the depth direction of the grooves to form hollow portions 360D and 361D connecting the adjacent grooves.

Next, as shown in FIG. 32, the substrate 30D is heat-treated (at, e.g., 1100 to 1200 degrees C.) in an atmosphere containing hydrogen to form an upper layer portion 355D which is a portion of the movable portion 340D.

Next, as shown in FIG. 29, a film formation portion 350D is formed on the main surface of the substrate 30D facing the z1 direction. As the film formation portion 350D, for example, a silicon layer deposited by a CVD method may be used. That is, by depositing the semiconductor layer, the semiconductor layer of the first and second MEMS elements 3D and 9D is made thick.

Further, as shown in FIG. 29, an electronic component 2D is formed inside the substrate 30D in a region spaced apart from the region where the first and second MEMS elements 3D and 9D are formed in the direction (y direction) perpendicular to the thickness direction of the movable portion 340D. Further, a protective film 10A, which is a portion of the movable portion 340D, is formed in the thickness direction of the film formation portion 350D. Moreover, in the second MEMS element 9D and the electronic component 2D, a protective film 10B which is a portion of the movable portion 340D is formed in the thickness direction of the protective film 10A. The first and second MEMS elements 3D and 9D may not include the protective film 10A or 10B.

In the present embodiment, the film thicknesses of the film formation portions 350D of the first and second MEMS elements 3D and 9D are the same. That is, the total film thicknesses T1 of the film thicknesses of the upper layer portion 355B and the film formation portions 350D of the first and second MEMS elements 3D and 9D are the same. Therefore, the hollow portion 361D of the second MEMS element 9D is narrower and smaller in area than the hollow portion 360D of the first MEMS element 3D. As a result, the first and second MEMS elements 3D and 9D differ in the area of the movable portion 340D thereof, and therefore can detect air pressures in different pressure ranges with high accuracy. The film thickness of the film formation portion 350D of the second MEMS element 9D may be equal to the film thickness of the film formation portion 350D of the first MEMS element 3D, or may be larger than the film thickness of the film formation portion 350D of the first MEMS element 3D.

By the above steps, the first and second MEMS elements 3D and 9D and the electronic component 2D can be manufactured. Further, after manufacturing the first and second MEMS elements 3D and 9D and the electronic component 2D, the substrate 30D including the first and second MEMS elements 3D and 9D and the electronic component 2D can be made into the same chip component Chip B.

Next, as shown in FIG. 24, the same chip component Chip B including the first and second MEMS elements 3D and 9D and the electronic component 2D is mounted on the substrate 1. Further, wirings 4 for electrically connecting the electrode pads 11 of the substrate 1, the electrode pads 24 of the electronic component 2D, the electrode pads 34 of the first MEMS element 3D, and the electrode pads 94 of the second MEMS element 9D are formed. Finally, the cover 6 and the substrate 1 are bonded by a bonding material 7.

By the above steps, a MEMS module A5 can be manufactured. In the MEMS module A5, a plurality of different MEMS elements (e.g., the first MEMS element 3D and the second MEMS element 9D) whose movable portions 340D have reduced areas is provided in one chip component. Therefore, it is possible to detect a high air pressure by reducing the area of the movable portion 340D and to accurately detect air pressures in different pressure ranges without reducing the accuracy of detection of an air pressure in a low air pressure range. Further, since the structural difference between the first and second MEMS elements 3D and 9D is the area of the movable portion 340D, it is possible to easily form a plurality of MEMS elements (e.g., the first MEMS element 3D and the second MEMS element 9D) by reducing the number of grooves 32D in the step of forming the grooves 31D and 32D of the plurality of MEMS elements.

As for an example of the operation of the MEMS module A5 according to the fifth embodiment, the above description on the operation of the MEMS module A1 can be referred to.

Other Embodiments

While the embodiments of the present disclosure have been described above, the descriptions and drawings that form a part of the disclosure are exemplary and should not be understood as being limitative. The present disclosure will reveal various alternative embodiments, examples, and operational techniques to those skilled in the art. In this way, the present disclosure includes various embodiments not described here.

According to the present disclosure in some embodiments, it is possible to provide a MEMS module capable of more accurately deriving a change in external air pressure. Further, it is possible to provide a MEMS module manufacturing method.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A MEMS module comprising:
   a first MEMS element and a second MEMS element each including a movable portion which is a portion of a substrate including a hollow portion formed therein, the movable portion configured to warp in shape according to an air pressure difference between an internal air pressure inside the hollow portion and external air pressure outside the hollow portion; and
   an electronic component configured to calculate a change in external air pressure outside the substrate by using an amount of warpage of the movable portion of at least one of the first MEMS element and the second MEMS element,
   wherein the amount of warpage of the movable portion according to the external air pressure differs between the first MEMS element and the second MEMS element, and
   wherein a film thickness of the movable portion adjoining the hollow portion of the second MEMS element is larger than a film thickness of the movable portion adjoining the hollow portion of the first MEMS element.

2. The MEMS module of claim 1, wherein the first MEMS element and the second MEMS element are included in different chip components, and
   wherein the chip components are arranged to be spaced apart from each other.

3. The MEMS module of claim 1, wherein the first MEMS element and the second MEMS element are included in the same chip component.

4. The MEMS module of claim 1, wherein the movable portion includes an upper layer portion adjoining the hollow portion in a thickness direction of the substrate, and includes a film formation portion stacked on the upper layer portion.

5. The MEMS module of claim 4, wherein the movable portion of each of the first MEMS element and the second MEMS element further includes a protective film stacked on the film formation portion, and
   wherein the protective film is made of at least one of a silicon oxide and a silicon nitride.

6. The MEMS module of claim 1, wherein an area of the movable portion adjoining the hollow portion of the second MEMS element is smaller than an area of the movable portion adjoining the hollow portion of the first MEMS element when viewed in the thickness direction of the substrate.

7. The MEMS module of claim 1, wherein the electronic component is included in an electronic component chip component different from chip components including the first MEMS element and the second MEMS element, and
   wherein the first MEMS element and the second MEMS element are arranged on the electronic component chip component.

8. The MEMS module of claim 1, wherein the electronic component is included in the same chip component as the first MEMS element and the second MEMS element.

9. A method of manufacturing a MEMS module, comprising:
   forming a plurality of grooves in a semiconductor layer included in a substrate;
   forming a hollow portion by etching the semiconductor layer from bottom surfaces of the grooves in a direction perpendicular to a depth direction of the grooves to connect the grooves and performing a heat treatment on the semiconductor layer so that a portion of the semiconductor layer melted by the heat treatment fills both ends of the grooves in the depth direction;
   forming an upper layer portion which is a portion of a movable portion adjoining the hollow portion when viewed in a thickness direction of the substrate;
   forming a first MEMS element and a second MEMS element by forming a film formation portion which is a portion of the movable portion stacked on the upper layer portion in the thickness direction of the substrate; and
   forming an electronic component to which output signals of the first MEMS element and the second MEMS element on the substrate are inputted,
   wherein the movable portion is formed so that a film thickness of the movable portion adjoining the hollow portion of the second MEMS element is larger than a film thickness of the movable portion adjoining the hollow portion of the first MEMS element.

10. The method of claim 9, wherein the second MEMS element and the first MEMS element are configured as different chip components by being formed on the substrate and then diced.

11. The method of claim 9, wherein the second MEMS element and the first MEMS element are configured as the same chip component by being formed on the substrate.

12. The method of claim 10, wherein the movable portion includes the upper layer portion adjoining the hollow portion in the thickness direction of the substrate, and includes the film formation portion stacked on the upper layer portion.

13. The method of claim 12, wherein the movable portion of each of the first MEMS element and the second MEMS element further includes a protective film stacked on the film formation portion in the thickness direction of the substrate.

14. The method of claim 9, wherein in the forming the plurality of grooves, the grooves are formed in a reduced number so that an area of the movable portion adjoining the hollow portion of the second MEMS element is smaller than an area of the movable portion adjoining the hollow portion of the first MEMS element when viewed in the thickness direction of the substrate.

15. The method of claim 9, wherein the electronic component is formed on the substrate and then diced to form an electronic component chip component.

16. The method of claim 9, wherein the electronic component is formed on the substrate to be spaced apart from the first MEMS element and the second MEMS element.

* * * * *